US008405621B2

(12) United States Patent  (10) Patent No.: US 8,405,621 B2
Gehani et al.  (45) Date of Patent: Mar. 26, 2013

(54) VARIABLE RATE MEDIA PLAYBACK METHODS FOR ELECTRONIC DEVICES WITH TOUCH INTERFACES

(75) Inventors: Samir B. Gehani, Sunnyvale, CA (US); Patrick Lee Coffman, San Francisco, CA (US); Timothy B. Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 913 days.

(21) Appl. No.: 12/240,974

(22) Filed: Sep. 29, 2008

(65) Prior Publication Data

US 2009/0174677 A1 Jul. 9, 2009

Related U.S. Application Data

(60) Provisional application No. 61/019,291, filed on Jan. 6, 2008.

(51) Int. Cl.
G06F 3/041 (2006.01)
G06F 3/00 (2006.01)
G06F 3/048 (2006.01)

(52) U.S. Cl. .................. 345/173; 715/810; 715/856

(58) Field of Classification Search .................. None
See application file for complete search history.

(56) References Cited

U.S. PATENT DOCUMENTS

| 4,837,798 A | 6/1989 | Cohen et al. |
| 4,935,954 A | 6/1990 | Thompson et al. |
| 4,972,462 A | 11/1990 | Shibata |
| 5,003,577 A | 3/1991 | Ertz et al. |
| 5,164,982 A | 11/1992 | Davis et al. |
| 5,202,961 A | 4/1993 | Mills et al. |
| 5,283,818 A | 2/1994 | Klausner et al. |
| 5,333,266 A | 7/1994 | Boaz et al. |
| 5,390,236 A | 2/1995 | Klausner et al. |
| 5,463,725 A | 10/1995 | Henckel et al. |
| 5,510,808 A | 4/1996 | Cina et al. |
| 5,524,140 A | 6/1996 | Klausner et al. |
| 5,550,559 A | 8/1996 | Isensee et al. |
| 5,559,301 A | 9/1996 | Bryan et al. |
| 5,572,576 A | 11/1996 | Klausner et al. |
| 5,745,716 A | 4/1998 | Tchao et al. |
| 5,809,267 A | 9/1998 | Moran et al. .................. 395/358 |
| 5,825,308 A | 10/1998 | Rosenberg |

(Continued)

FOREIGN PATENT DOCUMENTS

CN 1673939 A 9/2005
DE 196 21 593 A1 12/1997

(Continued)

OTHER PUBLICATIONS

International Search Report and Written Opinion for International Application No. PCT/US2008/086538, dated Jun. 2, 2009.

(Continued)

*Primary Examiner* — Amare Mengistu
*Assistant Examiner* — Tony N Ngo
(74) *Attorney, Agent, or Firm* — Morgan, Lewis & Bockius LLP

(57) ABSTRACT

In some embodiments, an electronic device with a touch interface detects one or more user gestures that correspond to instructions to vary the playback speed of a media file that is being played on the device. In response, the device initiates a variable rate scan through the media file, forward or backward. The touch interface can be a touch screen or touch pad.

36 Claims, 15 Drawing Sheets

U.S. PATENT DOCUMENTS

| | | | |
|---|---|---|---|
| 5,844,547 | A | 12/1998 | Minakuchi et al. |
| 5,859,638 | A | 1/1999 | Coleman et al. |
| 5,936,623 | A | 8/1999 | Amro |
| 5,943,052 | A | 8/1999 | Allen et al. |
| 5,973,676 | A | 10/1999 | Kawakura |
| 6,073,036 | A | 6/2000 | Heikkinen et al. |
| 6,278,443 | B1 | 8/2001 | Amro et al. |
| 6,323,846 | B1 | 11/2001 | Westerman et al. |
| 6,335,722 | B1 | 1/2002 | Tani et al. |
| 6,340,979 | B1 | 1/2002 | Beaton et al. |
| 6,353,442 | B1 | 3/2002 | Masui |
| 6,430,574 | B1 | 8/2002 | Stead |
| 6,469,695 | B1 | 10/2002 | White |
| 6,542,171 | B1 | 4/2003 | Satou et al. |
| 6,570,557 | B1 | 5/2003 | Westerman et al. |
| 6,677,932 | B1 | 1/2004 | Westerman |
| 6,690,387 | B2 | 2/2004 | Zimmerman et al. |
| 6,865,718 | B2 | 3/2005 | Montalcini |
| 6,954,899 | B1 | 10/2005 | Anderson |
| 6,966,037 | B2 | 11/2005 | Fredriksson et al. |
| 7,007,239 | B1 | 2/2006 | Hawkins et al. |
| 7,054,965 | B2 | 5/2006 | Bell et al. |
| 7,082,163 | B2 | 7/2006 | Uenoyama et al. |
| 7,152,210 | B1 | 12/2006 | Van Den Hoven et al. |
| 7,312,790 | B2 | 12/2007 | Sato et al. |
| 7,404,152 | B2 | 7/2008 | Zinn et al. |
| 7,408,538 | B2 | 8/2008 | Hinckley et al. |
| 7,436,395 | B2 | 10/2008 | Chiu et al. |
| 7,479,949 | B2 | 1/2009 | Jobs et al. |
| 7,786,975 | B2 | 8/2010 | Ording et al. |
| 7,996,792 | B2 | 8/2011 | Anzures et al. |
| 8,032,298 | B2 | 10/2011 | Han |
| 2002/0015024 | A1 | 2/2002 | Westerman et al. |
| 2002/0080151 | A1 | 6/2002 | Venolia |
| 2002/0122066 | A1 | 9/2002 | Bates et al. |
| 2002/0143741 | A1 | 10/2002 | Laiho et al. |
| 2002/0154173 | A1 | 10/2002 | Etgen et al. |
| 2002/0186252 | A1 | 12/2002 | Himmel et al. |
| 2002/0191029 | A1 | 12/2002 | Gillespie et al. |
| 2003/0008679 | A1 | 1/2003 | Iwata et al. |
| 2003/0076301 | A1 | 4/2003 | Tsuk et al. |
| 2003/0076306 | A1 | 4/2003 | Zadesky et al. |
| 2003/0122787 | A1 | 7/2003 | Zimmerman et al. |
| 2003/0128192 | A1 | 7/2003 | van Os |
| 2003/0131317 | A1 | 7/2003 | Budka et al. |
| 2003/0226152 | A1 | 12/2003 | Billmaier et al. |
| 2004/0100479 | A1 | 5/2004 | Nakano et al. |
| 2004/0143796 | A1 | 7/2004 | Lerner et al. ............... 715/538 |
| 2004/0252109 | A1 | 12/2004 | Trent, Jr. et al. |
| 2005/0012723 | A1 | 1/2005 | Pallakoff |
| 2005/0024345 | A1 | 2/2005 | Eastty et al. |
| 2005/0071437 | A1 | 3/2005 | Bear et al. |
| 2005/0177445 | A1 | 8/2005 | Church |
| 2005/0210403 | A1 | 9/2005 | Satanek |
| 2006/0007174 | A1 | 1/2006 | Shen |
| 2006/0010400 | A1* | 1/2006 | Dehlin et al. ............... 715/856 |
| 2006/0015819 | A1 | 1/2006 | Hawkins et al. |
| 2006/0018446 | A1 | 1/2006 | Schmandt et al. |
| 2006/0026521 | A1 | 2/2006 | Hotelling et al. ............ 715/702 |
| 2006/0026535 | A1 | 2/2006 | Hotelling et al. |
| 2006/0026536 | A1 | 2/2006 | Hotelling et al. |
| 2006/0038796 | A1 | 2/2006 | Hinckley et al. |
| 2006/0184901 | A1 | 8/2006 | Dietz |
| 2006/0234680 | A1 | 10/2006 | Doulton |
| 2006/0236262 | A1 | 10/2006 | Bathiche et al. |
| 2006/0239419 | A1 | 10/2006 | Joseph et al. |
| 2006/0253547 | A1 | 11/2006 | Wood et al. |
| 2006/0268020 | A1 | 11/2006 | Han |
| 2007/0002018 | A1 | 1/2007 | Mori |
| 2007/0080936 | A1 | 4/2007 | Tsuk et al. |
| 2007/0132789 | A1 | 6/2007 | Ording et al. |
| 2007/0146337 | A1 | 6/2007 | Ording et al. |
| 2007/0150830 | A1 | 6/2007 | Ording et al. |
| 2007/0192744 | A1 | 8/2007 | Reponen |
| 2007/0198111 | A1 | 8/2007 | Oetzel et al. .................... 700/94 |
| 2008/0042984 | A1 | 2/2008 | Lim et al. |
| 2008/0055264 | A1 | 3/2008 | Anzures et al. |
| 2008/0056459 | A1 | 3/2008 | Vallier et al. |
| 2008/0155417 | A1 | 6/2008 | Vallone et al. |
| 2008/0163131 | A1 | 7/2008 | Hirai et al. |
| 2008/0165141 | A1* | 7/2008 | Christie ........................ 345/173 |
| 2008/0168395 | A1 | 7/2008 | Ording et al. |
| 2008/0207176 | A1 | 8/2008 | Brackbill et al. |
| 2008/0259040 | A1 | 10/2008 | Ording et al. |
| 2008/0320391 | A1 | 12/2008 | Lemay et al. |
| 2009/0006958 | A1 | 1/2009 | Pohjola et al. |
| 2009/0075694 | A1 | 3/2009 | Kim et al. |
| 2009/0158149 | A1 | 6/2009 | Ko |
| 2009/0174667 | A1 | 7/2009 | Kocienda et al. |
| 2009/0178008 | A1 | 7/2009 | Herz et al. |
| 2009/0199119 | A1 | 8/2009 | Park et al. |
| 2010/0134425 | A1 | 6/2010 | Storrusten |
| 2010/0162181 | A1 | 6/2010 | Shiplacoff et al. |
| 2010/0231534 | A1 | 9/2010 | Chaudhri et al. |

FOREIGN PATENT DOCUMENTS

| | | |
|---|---|---|
| DE | 298 24 936 U1 | 8/2003 |
| DE | 10 2004 029 203 A1 | 12/2005 |
| EP | 0 679 005 A1 | 10/1995 |
| EP | 0 684 543 A1 | 11/1995 |
| EP | 0 795 811 A1 | 9/1997 |
| EP | 0 961 199 A | 12/1999 |
| EP | 0 994 409 A2 | 4/2000 |
| EP | 1 058 181 A1 | 12/2000 |
| EP | 1 615 109 A2 | 1/2006 |
| EP | 1 942 401 A1 | 7/2008 |
| KR | 2002-0069952 A | 9/2002 |
| WO | WO 93/20640 | 10/1993 |
| WO | WO 94/17469 A1 | 8/1994 |
| WO | WO 99/16181 A | 4/1999 |
| WO | WO 00/63766 A1 | 10/2000 |
| WO | WO 01/02949 | 1/2001 |
| WO | WO 01/29702 A2 | 4/2001 |
| WO | WO 2005/010725 A2 | 2/2005 |
| WO | WO 2006/020304 | 2/2006 |
| WO | WO 2006/020304 A2 | 2/2006 |
| WO | WO 2006/020305 | 2/2006 |
| WO | WO 2006/020305 A2 | 2/2006 |

OTHER PUBLICATIONS

Office Action dated Jun. 19, 2012, received in U.S. Appl. No. 12/566,669, 34 pages (Chaudhri).

Office Action dated Jun. 7, 2012, received in U.S. Appl. No. 12/666,673, 20 pages (Pisula).

Ahlberg, C. et al., "The Alphaslider: A Compact and Rapid Selector," ACM, Apr. 1994, proceedings of the SIGCHI conference on Human Factors in Computing Systems, pp. 365-371.

Arons, B., "The Audio-Graphical Interface to a Personal Integrated Telecommunications System," Massachusetts Institute of Technology, Department of Architecture Master Thesis, Jun. 1984, 88 pages.

Bederson, B, "Fisheye Menus," Human-Computer Interaction Lab, Institute for Advanced Computer Studies, Computer Science Department, University of Maryland, College Park, ACM 2000, 9 pages.

Coleman, D., "Meridian Mail Voice Mail System Integrates Voice Processing and Personal Computing," Speech Technology, vol. 4, No. 2, Mar./Apr. 1988, 7 pages.

Esato, "A Couple of My Mates. Meet JasJar and K-Jam (Many Pics)," 90 pages, Apr. 13, 2006.

Hinckley et al., "Quantitative Analysis of Scrolling Techniques," CHI 2002 Conf. On Human Factors in Computing Systems, pp. 65-72 (CHI Letters, vol. 4, No. 1), 2002.

Microsoft Corporation, Microsoft Office Word 2003 (SP2), 1983-2003, Microsoft Corporation, SP3 as of 2005, 5 pages MSWord 2003 Figures 1-5.

Microsoft Word 2000 (9.0.2720), 1999, Microsoft Corporation, 5 Pages MSWord figures 1-5.

Miller, D., "Personal/Java Application Environment," Jun. 8, 1999, http://java.sun.com/products/personaljava/touchable/, 12 pages.

Myers, B., "Shortcutter for Palm," The Pittsburgh Pebbles PDA Project, printed Dec. 19, 2006, 11 pages, http://www.cs.cmu.edu/~pebbles/v5/shortcutter/palm/index.html.

Northern Telecom, "Meridian Mail PC User Guide," 17 pages.

Potala Software, "Potala Telly," Oct. 19, 2005, http://web.archive.org/web/20051019000340/www.potalasoftware.com/telly.aspx, pp. 1-6.

Ramos, G., "Zliding: Fluid Zooming and Sliding for High Precision Parameter Manipulation," Oct. 2005, Proceedings of the 18th annual ACM Symposium on User Interface Software and Technology, pp. 143-152.

Rekimoto, J, "SmartSkin: An Infrastructure for Freehand Manipulation on Interactive Surfaces," CHI 2002, Apr. 20-25, 2002, 8 pages.

Roth et al., "Bezel Swipe: Conflict-Free Scrolling and Multiple Selection on Mobile Touch Screen Devices," Proceedings of the 27th International Conference on Human Factors in Computing Systems, Apr. 8, 2009, Boston MA, pp. 1523-1526.

Schmandt, C. et al., "A Conversational Telephone Messaging System" IEEE Transactions on Consumer Electronics, Aug. 1984, vol. CE-30, 4 pages.

Schmandt, C. et al., "Phone Slave: A Graphical Telecommunications Interface," Proceeding of the SID, vol. 26/1, 1985, 4 pages.

Schmandt, C. et al., "Phone Slave: A Graphical Telecommunications Interface," Society for Information Display, 1984 International Symposium Digest of Technical Papers, Jun. 1984, San Francisco, CA, 4 pages.

Smith, R., "Sygic. Mobile Contacts," Sep. 2, 2004, 13 pages, http://www.pocketnow.com/index.php?a=portal_detail&t=reviews&id=467.

International Search Report and Written Opinion dated Nov. 22, 2007, received in International Application No. PCT/US2006/061333, which corresponds to U.S. Appl. No. 11/322,551, 16 pages (Ording).

International Search Report and Written Opinion dated Feb. 15, 2008, received in International Application No. PCT/US2006/061337, which corresponds to U.S. Appl. No. 11/322,553, 12 pages (Ording).

European Search Report dated Sep. 2, 2009, received in European Application No. 09162953.5, which corresponds to U.S. Appl. No. 11/322,553, 6 pages (Ording).

International Search Report dated Apr. 26, 2007, received in International Application No. PCT/US2006/061627, which corresponds to U.S. Appl. No. 11/322,547, 11 pages (Ording).

International Search Report and Written Opinion dated Feb. 21, 2008, received in International Application No. PCT/US2007/077443, which corresponds to U.S. Appl. No. 11/770,720, 11 pages (Anzures).

International Search Report and Written Opinion dated Jul. 4, 2008, received in International Application No. PCT/US2008/050083, which corresponds to U.S. Appl. No. 11/968,064, 14 pages (Ording).

International Preliminary Report on Patentability dated Jul. 15, 2010, received in International Application No. PCT/US2008/086538, which corresponds to U.S. Appl. No. 12/240,974, 11 pages (Gehani).

International Search Report and Written Opinion dated Jun. 18, 2010, received in International Application No. PCT/US2010/027088, which corresponds to U.S. Appl. No. 12/566,669, 13 pages (Chaudhri).

International Search Report and Written Opinion dated Nov. 15, 2010, received in International Application No. PCT/US10/48443, which corresponds to U.S. Appl. No. 12/567,717, 7 pages (Marr).

International Search Report and Written Opinion dated May 11, 2011, received in International Application No. PCT/US2010/062319, which corresponds to U.S Appl. No. 12/788,279, 16 pages (Chaudri).

Office Action dated Dec. 18, 2008, received in U.S. Appl. No. 11/322,551, 24 pages (Ording).

Office Action dated Jun. 15, 2009, received in U.S. Appl. No. 11/322,551 18 pages (Ording).

Office Action dated Sep. 22, 2009, received in U.S. Appl. No. 11/322,551, 19 pages (Ording).

Office Action dated Mar. 12, 2010, received in U.S. Appl. No. 11/322,551, 21 pages (Ording).

Notice of Allowance dated Jul. 21, 2010, received in U.S. Appl. No. 11/322,551, 8 pages (Ording).

Office Action dated Jun. 15, 2007, received in U.S. Appl. No. 11/322,553, 16 pages (Ording).

Office Action dated Feb. 5, 2008, received in U S. Appl. No. 11/322,553, 11 pages (Ording).

Office Action dated Aug. 5, 2008, received in U.S. Appl. No. 11/322,553, 28 pages (Ording).

Office Action dated Dec. 26, 2008, received in U.S. Appl. No. 11/322,553, 26 pages (Ording).

Office Action dated Jun. 17, 2009, received in U.S. Appl. No. 11/322,553, 30 pages (Ording).

Office Action dated Apr. 5, 2010, received in U.S. Appl. No. 11/322,553, 24 pages (Ording).

Office Action dated Sep. 1, 2009, received in Australian patent application No. 2006321681, which corresponds to U.S. Appl. No. 11/322,553, 2 pages (Ording).

Office Action dated Dec. 23, 2009, received in Australian patent application No. 2006321681, which corresponds to U.S. Appl. No. 11/322,553, 2 pages (Ording).

Notice of Acceptance dated Sep. 14, 2010, received in Australian Application No. 2006321681, which corresponds to U.S. Appl. No. 11/322,553, 3 pages (Ording).

Office Action dated Jan. 8, 2010, received in Chinese Patent Application No. 200680052109.3, which corresponds to U.S. Appl. No. 11/322,553, 6 pages (Ording).

Office Action dated Nov. 9. 2010, received in Chinese Patent Application No. 200680052109.3, which corresponds to U.S. Appl. No. 11/322,553, 8 pages (Ording).

Office Action dated May 5, 2011, received in Chinese Patent Application No, 200680052109.3, which corresponds to U.S. Appl. No. 11/322,553, 9 pages (Ording).

Office Action dated Jan. 10, 2012, received in Chinese Patent Application No. 200680052109.3, which corresponds to U.S. Appl. No. 11/322,553, 17 pages (Ording).

Office Action dated Sep. 8, 2009, received in German patent application No. 11 2006 003 309.3-53 which corresoonds to U.S. Appl. No. 11/322,553, 8 pages (Ording).

Office Action dated Apr. 6, 2011, received in German patent application No. 11 2006 003 309.3, which corresponds to U.S. Appl. No. 11/322,553, 5 pages (Ording).

Office Action dated Apr. 6, 2011, received in German Patent Application No. 11 2006 004 220.3, which corresponds to U.S. Appl. No. 11/322,553, 5 pages (Ording).

Office Action dated Sep. 2, 2009, issued in European Application No. 09162953.5, which corresponds to U.S. Appl. No. 11/322,553, 6 pages (Ording).

Office Action dated May 31, 2010, received in Korean Application No. 10-2008-7016570, which corresponds to U.S. Appl. No. 11/322,553, 5 pages (Ording).

Office Action dated Jan. 5, 2011, received in Korean Patent Application No. 10-2009-7011991, which corresponds to U.S. Appl. No. 11/322,553, 6 pages (Ording).

Office Action dated Oct. 30, 2007 received in U.S. Appl. No. 11/322,547, 16 pages (Ording).

Office Action dated Jun. 9, 2008, received in U.S. Appl. No. 11/322,547, 17 pages (Ording).

Office Action dated Aug. 22, 2008, received in U.S. Appl. No. 11/322,547, 3 pages (Ording).

Office Action dated Feb. 5, 2009, received in U.S. Appl. No. 11/322,547, 13 pages (Ording).

Office Action dated Aug. 6, 2009, received in U.S. Appl. No. 11/322,547, 13 pages (Ording).

Final Office Action dated May 28, 2010, received in U.S. Appl. No. 11/322,547, 16 pages (Ording).

Notice of Allowance dated Aug. 6, 2010, received in U.S. Appl. No. 11/322,547, 14 pages (Ording).

Office Action dated Jan. 8, 2010, received in Chinese Patent Application No. 200680052778.0; which corresponds to U.S. Appl. No. 11/322,547, 19 pages (Ording).

Office Action dated Aug. 11, 2010, received in Chinese Application No. 200680052778.0, which corresponds to U.S. Appl. No. 11/322,547, 9 pages (Ording).

Office Action dated May 6, 2011, received in Chinese Patent Application No. 201010516160.3, which corresponds to U.S. Appl. No. 11/322,547, 10 pages (Ording).

Office Action dated Oct. 14, 2009, received in German Patent Application No. A116012WODE, which corresponds to U.S. Appl. No. 11/322,547, 9 pages (Ording).
Office Action dated Apr. 21, 2009, received in the European Patent Application No. 06 846 477.5, which corresponds to U.S. Appl. No. 11/322,547, 6 pages (Ording).
Office Action dated May 31, 2010, received in Korean Patent Application No. 10-2008-7017977, which corresponds to U.S. Appl. No. 11/322,547, 7 pages (Ording).
Office Action dated Jan. 4, 2011, received in U.S. Appl. No. 11/770,720, 18 pages (Anzures).
Notice of Allowance dated May 20, 2011, received in U.S. Appl. No. 11/770,720, 8 pages (Anzures).
Office Action dated Feb. 17, 2010, received in Australian Patent Application No. 2007292473, which corresponds to U.S. Appl. No. 11/770,720, 1 page (Anzures).
Office Action dated Oct. 25, 2010, received in Chinese Patent Application No. 200780040362.1, which corresponds to U.S. Appl. No. 11/770,720, 18 pages (Anzures).
Office Action dated Jul. 21, 2011, received in Chinese Patent Application No. 200780040362.1, which corresponds to U.S. Appl. No. 11/770,720, 19 pages (Anzures).
Office Action dated Jun. 7, 2010, received in German Patent Application No. 11 2007 002 090.3-53, which corresponds to U.S. Appl. No. 11/770,720, 8 pages (Anzures).
Office Action dated Feb. 24, 2010, received in European Patent Application No. 07 814 635.4-2212, which corresponds to U.S. Appl. No. 11/770,720, 4 pages (Anzures).
Summons to attend oral proceedings dated Nov. 24, 2010 received in European Patent Application No. 07 814 635.4, which corresponds to U.S. Appl. No. 11/770,720, 5 pages (Anzures).
Decision to Grant dated Nov. 11, 2011, received in European Patent Application No. 2 069 895, which corresponds to U.S. Appl. No. 11/770,720, 1 page (Anzures).
Office Action dated Jun. 6, 2011, received in Japanese Patent Application No. 2009 527504, which corresponds to U.S. Appl. No. 11/770,720, 4 pages (Anzures).
Office Action dated Feb. 15, 2011, received in Korean Patent Application No. 10-2009-700762, which corresponds to U.S. Appl. No. 11/770,720, 3 pages (Anzures).
Office Action dated May 15, 2009, received in U.S. Appl. No. 11/968,064, 20 pages (Ording).
Final Office dated Jan. 5, 2010, received in U.S. Appl. No. 11/968,064, 20 pages (Ording).
Office Action dated Sep. 23, 2011, received in U.S. Appl. No. 12/566,638, 20 pages (Ording).
Office Action dated May 7, 2012, received in U.S. Appl. No. 12/566,638, 15 pages (Ording).
Office Action dated Apr. 23, 2012, received in Chinese Patent Application No. 201010292415.2, which corresponds to U.S. Appl. No. 12/567,717, 9 pages (Marr).
Office Action dated May 23, 2012, received in U.S. Appl. No. 12/566,671, 24 pages (Chaudhri).

\* cited by examiner

VARIABLE RATE MEDIA PLAYBACK METHODS FOR ELECTRONIC DEVICES WITH TOUCH INTERFACES

RELATED APPLICATIONS

This application claims priority to U.S. Provisional Patent Application No. 61/019,291, "Variable Rate Media Playback Methods for Electronic Devices with Touch Interfaces," filed Jan. 6, 2008, which is incorporated herein by reference in its entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. patent application Ser. No. 11/850,635, "Touch Screen Device, Method, and Graphical User Interface for Determining Commands by Applying Heuristics," filed Sep. 5, 2007; (12) U.S. patent application Ser. No. 11/322,549, "Unlocking a Device by Performing Gestures on an Unlock Image," filed Dec. 23, 2005; and (13) U.S. patent application Ser. No. 11/322,550, "Indication of Progress Towards Satisfaction of a User Input Condition," filed Dec. 23, 2005. All of these applications are incorporated by reference herein in their entirety.

TECHNICAL FIELD

The disclosed embodiments relate generally to touch-sensitive user interfaces for electronic devices and, more particularly, to touch-sensitive interfaces for controlling playback of digital media, including fast scanning through media files.

BACKGROUND

Touch-sensitive interfaces are used in many devices to provide a user interface through with the user may interact with the device. Touch-sensitive interfaces include touch pads and touch screens.

Touch pads are typically flat, touch-sensitive surfaces that enable a user to interact with content displayed on an electronic device through finger gestures, such as taps or strokes, made on the touch pad. Touch pads are made from different technologies (e.g., capacitive sensing, membrane switches and resistive sensors) and can be used in a wide range of electronic devices, including on laptops and keyboards connected to personal computers, and as stand-alone user interfaces devices, similar to a mouse. Among other things, a touch pad enables a user to move an on-screen cursor in directions that correspond to the motion of the user's finger on the touch pad.

Touch screens are used in electronic devices to display graphics and text, and to provide a user interface through which a user may interact with the device. A touch screen detects and responds to contact on the touch screen. A device may display one or more soft keys, menus, and other user-interface objects on the touch screen. A user may interact with the device by contacting the touch screen at locations corresponding to the user-interface objects with which she wishes to interact. Touch screens are becoming more popular for use as displays and as user input devices on portable devices, such as mobile telephones, personal digital assistants (PDAs), and cameras.

Touch-sensitive interfaces, when used to control media playback in a media player application, sometimes lack the intuitive feel and/or functionality of dedicated media controls. For example, when used to control playback of media content on an electronic device, a touchpad is commonly used to move an on-screen pointer to engage responsive regions displayed as part of a media player application's user interface (such as a fast forward region displayed as part of an on-screen control bar). This is generally an inconvenient interface when compared to the rich user interfaces provided to control media playback in dedicated media player devices. One example of such a rich user interface is the click wheel technology used in Apple's iPod® family of media player devices. As is well known, the click wheel interface enables the intuitive selection and control of media playback using, among other things, circular finger motions and clicks. Other physical interfaces for media playback control include the jog/shuttle interface of DVD players, and the button-based interfaces seen on CD and DVD players and TV remotes that allow users, among other functions, to play media at normal speed, fast forward, scan (playback media at different speeds), reverse/rewind and stop media playback.

Therefore, there is a need for touch-sensitive interfaces that provide a more intuitive experience for users when controlling media playback in a media player application, including specifying varying media playback scan rates and scan directions.

SUMMARY

In some embodiments, a method for use in an electronic device with a touch interface and a media player includes: while a media a media file is playing in the media player, detecting a first user gesture on the touch interface, wherein the first user gesture is associated with a request to vary scan rate through the media file; in response to the first user gesture, changing playback speed of the media file by a first scan rate factor; detecting a second user gesture on the touch interface that is connected to the first user gesture, wherein the second user gesture is also associated with a request to vary scan rate through the media file; and in response to the second user gesture, changing playback speed of the media file by an additional second scan rate factor.

In other embodiments, a method for use in an electronic device with a touch interface and a media player includes: while a media file is playing in the media player, detecting a first user gesture on the touch interface, wherein the first user gesture is associated with a request to vary scan rate through the media file; detecting a distance, speed, and/or gesture duration on the touch interface for the first user gesture; and in response to the first user gesture, changing playback speed of the media file by a scan rate factor determined by the distance, speed and/or gesture duration.

In other embodiments, a method for use in an electronic device with a touch interface and a media player includes:

while a media file is playing in the media player, detecting a first rotational user gesture on the touch interface, wherein the first rotational user gesture is associated with a request to vary scan rate through the media file; detecting an angular distance, speed and/or gesture duration on the touch interface for the first rotational user gesture; and in response to the first user rotational gesture, changing playback speed of the media file by a scan rate factor that is a function of the angular distance, speed and/or gesture duration.

In yet another embodiment, a method for use in an electronic device with a touch interface and a media player includes: while a media file is playing in the media player, detecting a first user gesture on the touch interface, wherein the first user gesture is associated with a request to vary scan rate through the media file; and in response to the first user gesture, changing playback speed of the media file by a first predetermined scan rate factor independent of length or speed of the first user gesture. The method can further include: detecting one or more subsequent connected user gestures on the touch interface, wherein each of the subsequent connected user gestures is associated with a request to vary scan rate through the media file; and in response to each of the subsequent connected user gestures, changing playback speed of the media file by a respective additional predetermined scan rate factor independent of length or speed of the respective connected user gestures.

In any of these embodiments, the touch interface can be a touch screen or a touch pad, and the electronic devices in which these methods are implemented can include any sort of electronic device, ranging from a portable device with a touch screen, to a laptop with an integrated touch pad, to a personal computer with a separate touch pad interface.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1A:
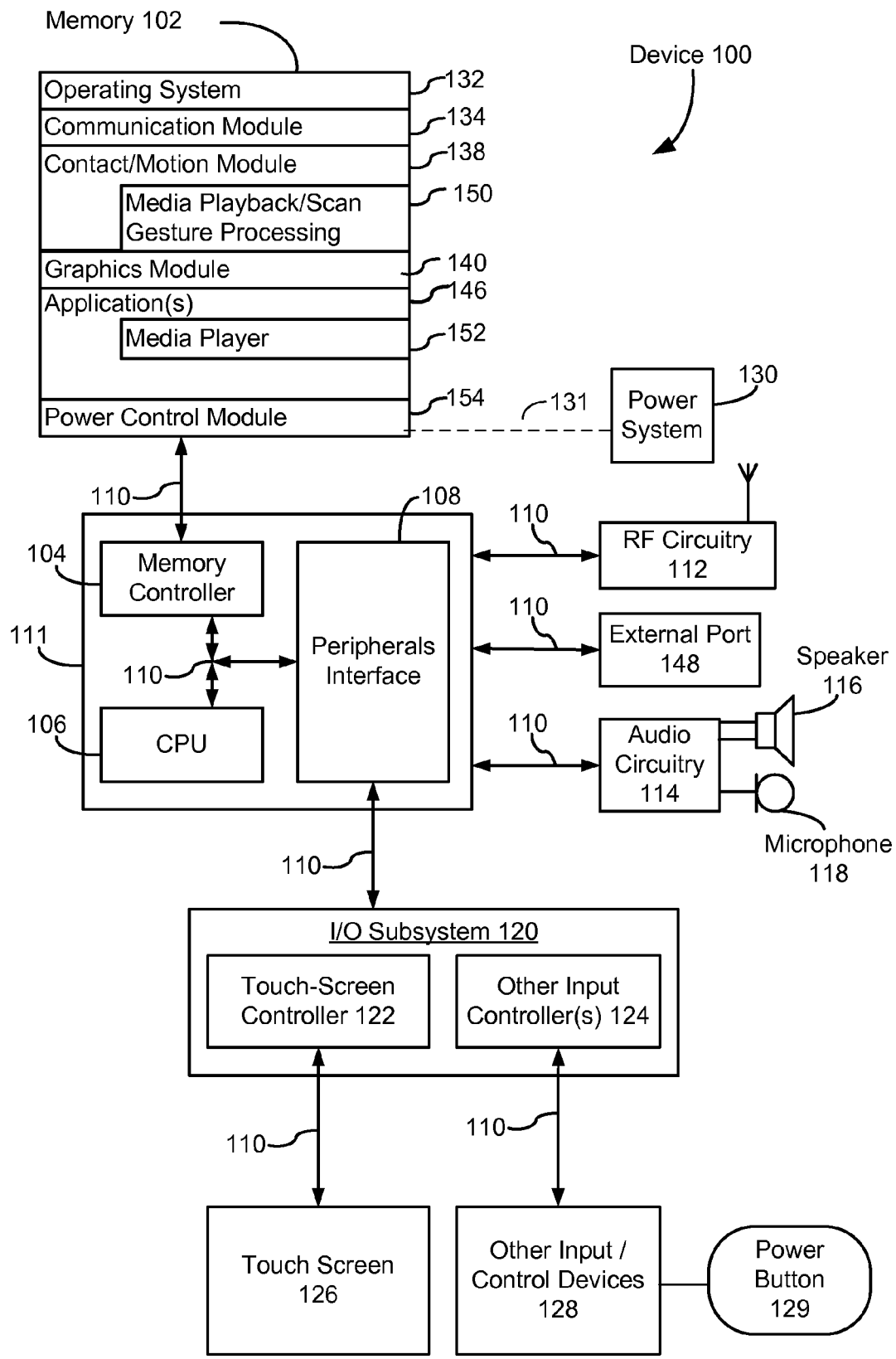
FIG. 1A is a block diagram illustrating an electronic device with a touch screen interface, according to some embodiments.

FIG. 1A illustrates an electronic device (portable, semi-portable, or not portable) with a touch screen, according to some embodiments of the invention. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, a mobile phone, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The device 100 can also be any other sort of electronic device that has a touch-screen. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/ to the touch screen 126. The touch screen 126 displays visual output to the user. The visual output may include text, graphics, video, and any combination thereof. Some or all of the visual output may correspond to user-interface objects, further details of which are described below.

The touch screen 126 also accepts input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference by their entirety. However, the touch screen 126 displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a stylus, finger, and so forth.

A touch-sensitive display 126 in some embodiments may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the device 100 may include a touchpad (shown in FIG. 1B) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a power control module 154, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 138 and the touch screen controller 122 also detects contact on the touchpad.

Media Playback Gesture Processing/Variable Rate Scan

The contact/motion module 138 includes a media playback gesture processing routine 150 (or instructions) to process user gestures related to controlling the speed and/or direction of media playback in a device 100. One media playback function enabled by the playback gesture processing routine 150 is variable rate scan, which allows a user to scan through a media file during playback—typically in a media player application 152, such as Quicktime (trademark of Apple Inc.)—at varying accelerated scan rates, either forward or backward. The variable rate scan is applicable to a wide range of media file types, including audio and video files.

In some embodiments described below, variable scan rates are chosen (in response to predefined user gestures, described below) from a predetermined/programmed collection of scan rate factors, such as twice (sometimes represented as "2×"), four times ("4×"), eight times ("8×"), and sixteen times ("16×") normal playback speed for the media file, and corresponding scan rate factors in the reverse playback direction (represented as "−2×", "−4×", "−8×" and "−16×" scan rate factors). Of course, these values are only exemplary, and any combination of predetermined scan rate factors can be employed. In some embodiments, a user accelerates/varies the scan rate for a media file during playback by connecting multiple distinct media scan gestures, the scan rate increasing or decreasing in response to each one of the connected scan rate gestures. For example, given the predetermined scan rate factors of 2×, 4×, 8× and 16×, a user could accelerate playback of a media file from 2× to 4× to 8× normal playback speed by connecting three variable rate scan gestures while the media file is being played in the media player.

In some embodiments, a user connects gestures by issuing a series of discrete gestures without breaking contact with the touch sensitive interface. For example, given a variable-rate-scan gesture that is a short, approximately horizontal, two-fingered swipe (one embodiment described herein), a user would connect three such variable-rate-scan gestures by issuing three two-finger swipe gestures separated by pauses—all while their finger tips remain in contact with the touch sensitive interface. This connection method is exemplary—other methods of connecting gestures can also be employed with embodiments of the present invention. Methods for connecting gestures to achieve variable rate scan through a media file are described in greater detail below, in reference to FIG. 4.

A user can employ different gestures to initiate variable rate scan operations. These different gesture types can include, among others, a multi-touch linear swipe gesture made by contacting the touch sensitive interface with two closely-spaced finger tips, or a multi-touch rotational gesture made by contacting the touch sensitive interface with separated finger tips and then rotating one of the fingers around the contact point made by the other finger tip. The present invention can be employed with different gestures and gesture styles and is not limited to the gestures described herein, which are exemplary. In addition, the present invention is equally applicable to gestures or to connected sequences of gestures performed in different directions (e.g., leftward as opposed to rightward, or upward as opposed to downward), and is not to be limited to descriptions herein of gestures performed in particular directions, which are exemplary.

In some embodiments, variable scan rates can be determined by the media playback gesture processing module 150 as a function of some physical measure of a gesture, such as the speed and/or linear distance (and gesture direction) across the touch sensitive interface covered by the gesture; the rotational speed and/or angular distance covered by a rotational gesture; or the amount of time the user's fingers remain in contact with the touch sensitive interface after initiating the variable rate scan operation. In these embodiments, the scan rates can be computed using one or more predefined functions of the relevant physical measures, or they can be selected from predefined/programmed scan rate values, as described above. For example, a user can quickly accelerate the scan rate for playback of a media file from normal speed to 16× normal speed by issuing a long (or fast) two-fingered swipe gesture to the right on the touch sensitive interface, or keeping their fingers in contact with the interface until the scan rate is accelerated to the desired speed. The use of this sort of gesture is described in greater detail below, in reference to FIG. 8. Further details regarding embodiments for processing media playback gestures, including gestures for variable rate scan through media files during playback, are described below.

Another variable scan rate feature supported by the media playback gesture processing module 150 is media scan with playback in either direction (forward or backward), with the ability to change scan direction and speed during a variable scan rate operation. For example, in some embodiments that provide this functionality, a user can initiate a forward scan at an accelerated rate by using a forward scan gesture (e.g., a two fingered swipe gesture going approximately from left to right on the touch sensitive interface) and then, by using a reverse scan gesture (e.g., a two fingered swipe gesture going approximately from right to left on the touch sensitive interface) immediately initiate variable rate scan in the reverse direction (i.e., in response to the leftward swipe, the media playback gesture processing module 150 would initiate reverse playback of the media file). This operation is described further in reference to FIG. 5.

In other embodiments, when a user issues one or more scan gestures that are associated with a reverse in playback direction from the current playback direction (i.e., one or more leftward two-fingered swipes issued by the user when the media file is currently being scanned in the forward direction), the media playback gesture processing module 150 first slows (until normal playback speed is reached) and then reverses the scan direction of the media file. This operation is described further in reference to FIG. 5.

The media playback gesture processing module 150 enables intuitive user interaction with the variable scan rate feature by providing different operations in response to cessation of user contact with the touch sensitive interface. In some embodiments, the media playback gesture processing module 150 reverts to normal playback upon any cessation of user contact with the touch sensitive interface. In other embodiments, following cessation of user contact the media playback gesture processing module 150 holds the accelerated scan rate and does not return to normal playback speed until the user issues a third gesture associated with that purpose (such as a two fingered tap on the touch screen interface). These operations are described further in reference to FIG. 4.

In some embodiments the contact/motion module 138 and the media scan processing module 150 support multi-touch user gestures, as described in some of the patent applications referenced above, which are incorporated herein. This application incorporates teachings from those references related to, among other things, resolving gestures that are approximately correct and in approximately the expected direction and/or orientation. Accordingly, any description or reference in this application to a gesture occurring in a particular direction and/or orientation or has a particular other characteristic shall presume that the gesture is at best approximately as described. In different embodiments, these modules 138, 150 can also implement the variable rate scan operations described herein using other than multi-touch technology.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

The power control module 154 detects, mediates, and implements user power-off and power-on requests. It is responsive to inputs provided by the touch-screen controller 122 and the power system 130. It also issues control signals 131 to the power system 130 to implement user power-off requests.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), a media player 150 (which plays recorded videos or music stored in one or more media files, such as Quicktime, DIVX, or MPEG video files; or MP3 or AAC audio files, to name just a few possibilities), etc.

In some embodiments, the device 100 may include the functionality of an MP3 player, such as an iPod (trademark of Apple Inc.). The device 100 may, therefore, include a 36-pin connector that is compatible with the iPod. An example of such a device is the iPhone (trademark of Apple Inc.). In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In some embodiments, the device 100 includes the touch screen 126, the touchpad, a power button 129 (which can be any manner of physical interface device, including but not limited to, a push button, switch, dial, slider, rocker button or touchpad) for powering the device on/off and locking the device, a volume adjustment rocker button and a slider switch for toggling ringer profiles. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button" 410. In some other embodiments, the menu button 410 may be a physical push button or other physical input/control device instead of a touchpad.

Figure 1B:
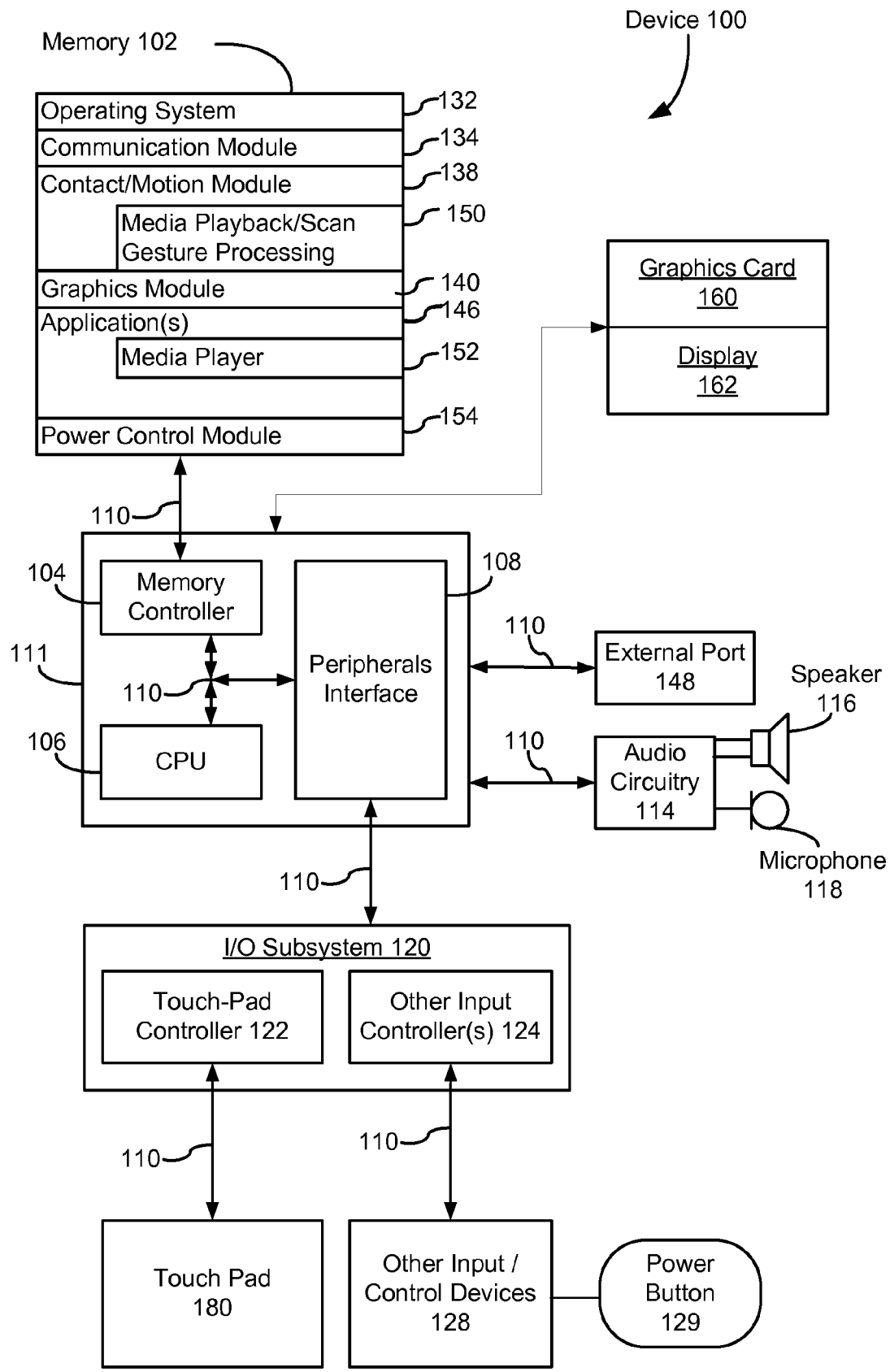
FIG. 1B is a block diagram illustrating an electronic device, with a touch pad interface, according to some embodiments.

FIG. 1B shows an embodiment of an electronic device 100B that does not incorporate a touch screen 126, but instead includes a touch pad 180 to receive user touch inputs, including media playback gestures, and a graphics card 160 and display 162 to output images to the user. The device 100B can be any electronic device with a similar configuration, including but not limited to a handheld computer, a laptop computer, a personal computer or workstation, a personal digital assistant (PDA) with a touch pad, or the like, including a combination of two or more of these items. It should be appreciated that the device 100B is only one example of an electronic device 100B, and that the device 100B may have more or fewer components than shown, or a different configuration of components. The various components shown in FIG. 1B may be implemented in hardware, software or a combination of hardware and software, including one or more signal processing and/or application specific integrated circuits.

Variable Rate Scan Methods

Figure 2A:
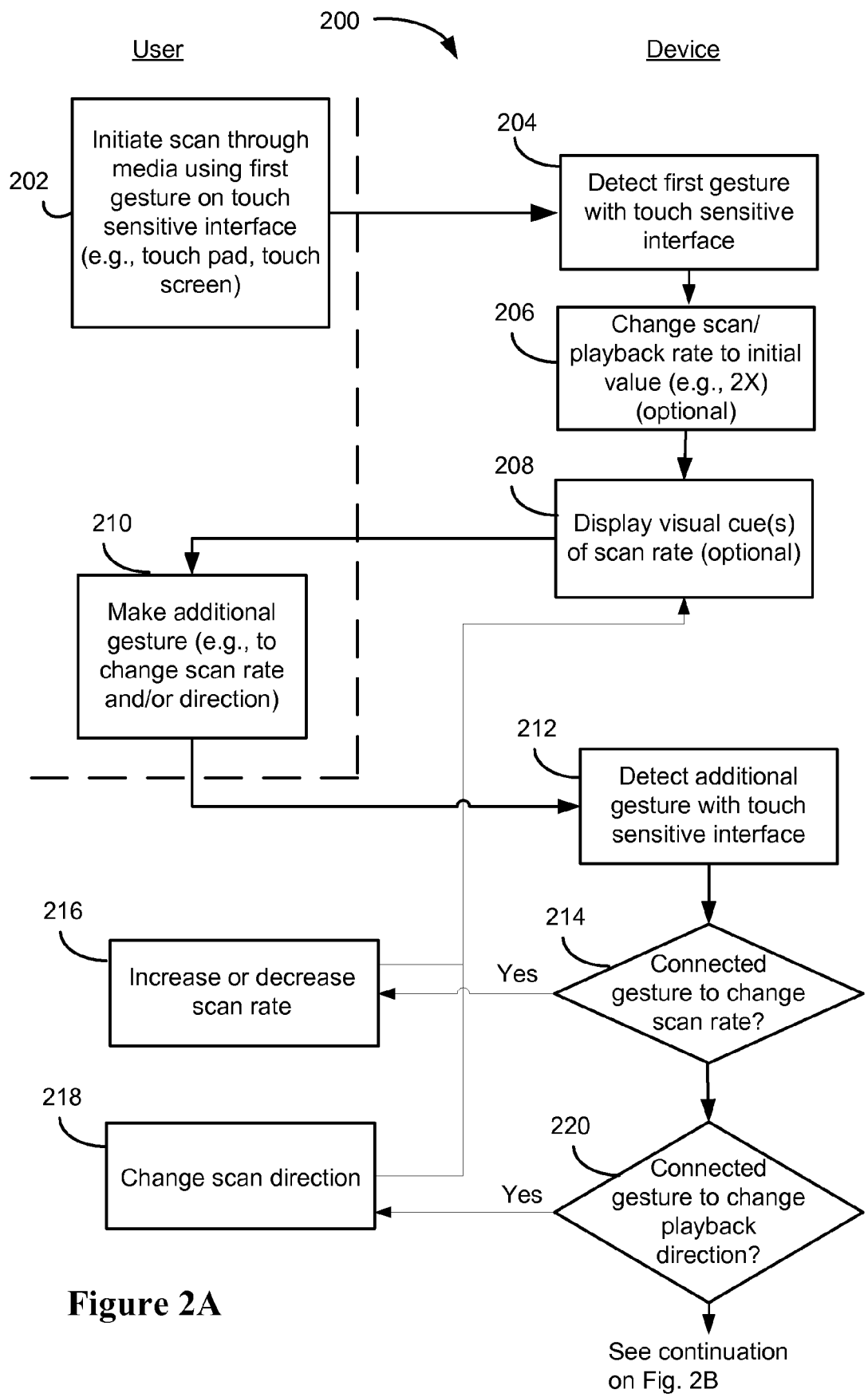
FIGS. 2A and 2B are flow diagrams illustrating a process for providing variable rate media playback/scan using a touch sensitive interface, according to some embodiments.
Figure 2B:
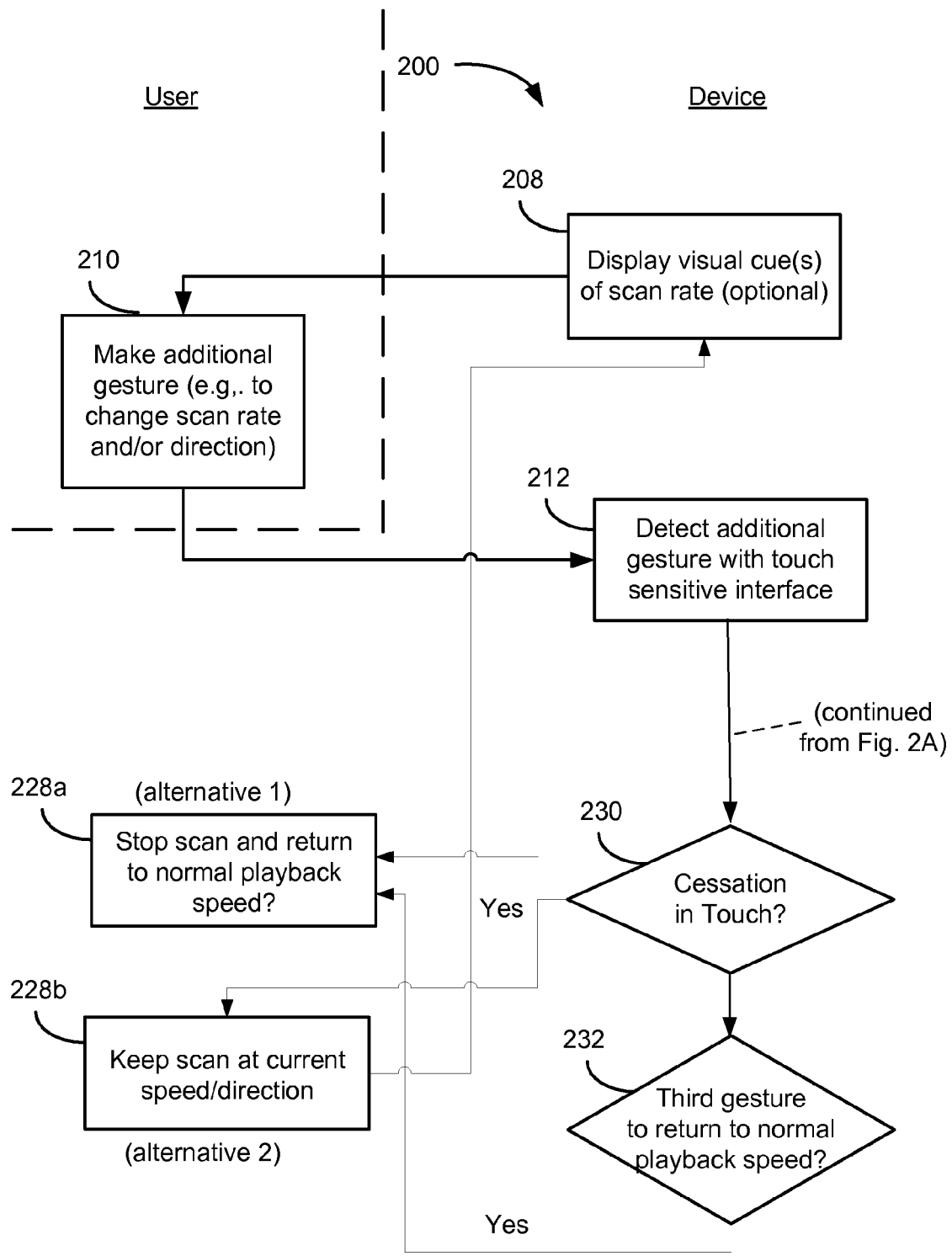

FIGS. 2A and 2B are flow diagrams illustrating a process 200 for providing variable rate media playback/scan in an electronic device using a touch sensitive interface, according to some embodiments. These processes can be implemented in the media playback gesture processing module 150, described in reference to FIG. 1A. The process steps described with reference to these figures are attributed to action of a user (shown to the left and above the dashed line) or to a device 100, generally under the control of the media playback gesture processing module 150.

Referring to FIG. 2A, the process 200 begins when a user initiates a variable rate scan operation by issuing a first gesture on the touch interface that is associated with a variable scan rate operation (202). Different exemplary gestures for doing this have already been described above in reference to FIG. 1 (one such gesture is a two-fingered touch and swipe). In response, the device 100 under control of the media playback gesture processing module 150 detects/recognizes the first gesture (204), optionally changes the playback rate of the media file to an initial value (such as 2×) (206) and optionally displays a user indication of the current scan rate (208). While maintaining contact on the touch sensitive interface the user may make additional connected gestures (210) (e.g., to change scan rate and/or direction). For example, the additional gesture might be a second two-fingered swipe following a pause in the first gesture. The device 100 detects the additional gestures (212) and then tests whether they correspond to user requests to change scan rate (214) or direction (220). If the gesture corresponds to a request to change scan rate the device increases or decreases the scan rate (216) and optionally displays a user indication of the current scan rate (208). If the gesture corresponds to request to change scan direction the device changes the scan direction (218) and optionally displays a user indication of the current scan rate (208).

Referring to FIG. 2B, which shows a continuation of the process 200, the device 100 responds to a cessation in user contact/touch (230—Yes) identified by the touch sensitive interface (212) by either stopping the media scan operation and returning to normal playback speed (228a) or by keeping the media scan in effect at the current speed and direction (228b). Which option is chosen depends on the particular embodiment of the media playback gesture processing module 150. If the device 100 elects to keep scan at the current speed/direction 228b, it will wait for a predefined third gesture (such as a two fingered tap on the touch sensitive interface) (232—Yes) to return media play to normal playback speed (228a).

Figure 3A:
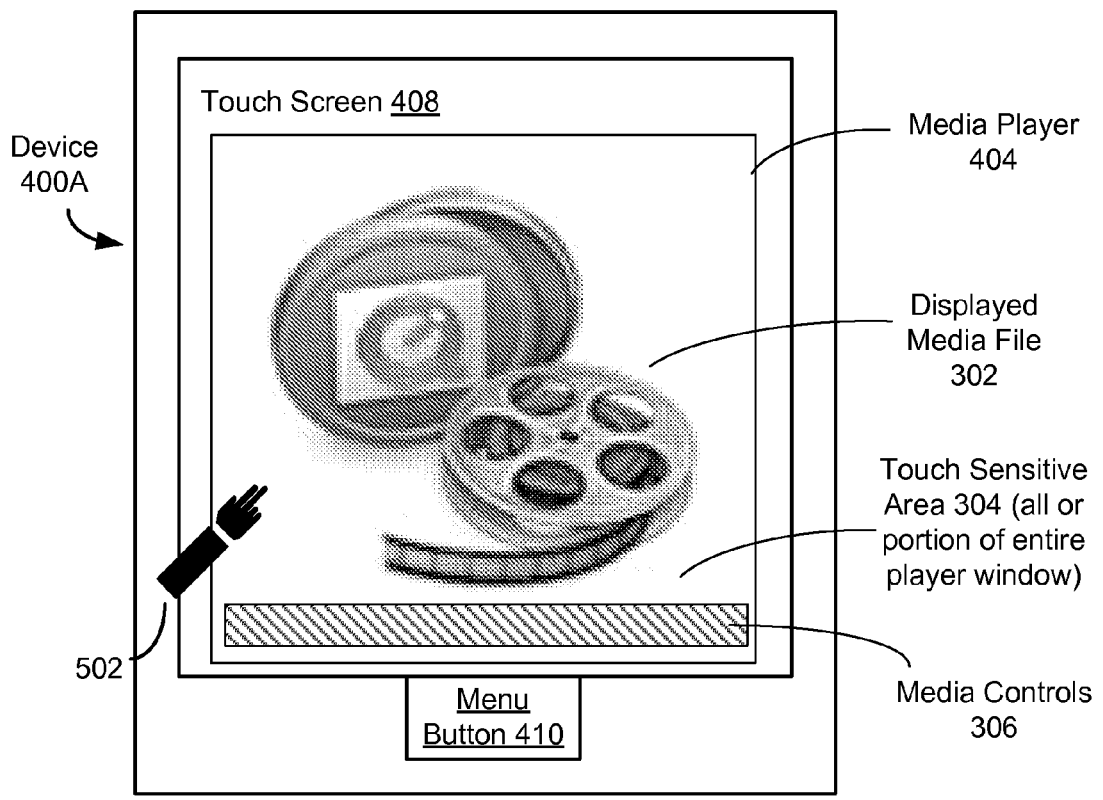
FIGS. 3A and 3B illustrate devices configured to implement variable rate scan for media playback in response to user gestures on a touch sensitive interface, such as a touch screen (FIG. 3A) or a touch pad (FIG. 3B).
Figure 3B:
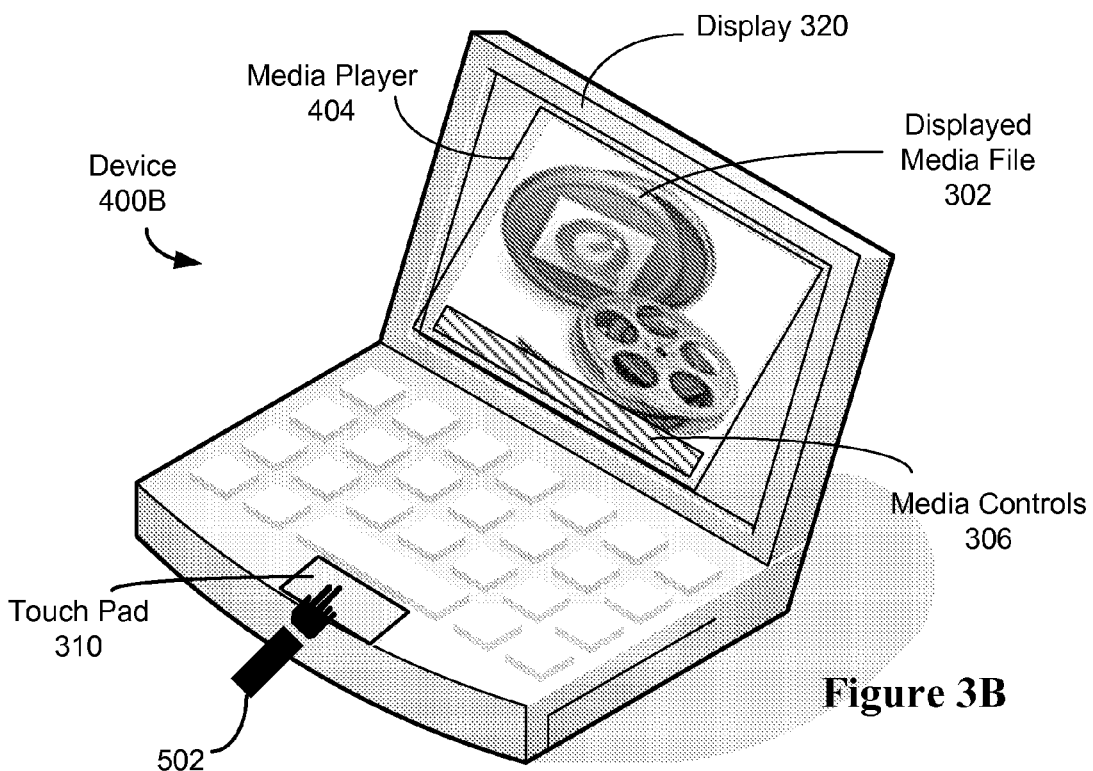

FIGS. 3A and 3B illustrate devices configured to implement variable rate scan for media playback in response to user gestures on a touch sensitive interface, such as a touch screen (FIG. 3A) or a touch pad (FIG. 3B). FIG. 3A illustrates a portable device 400A, such as the Apple iPhone, which includes a touch screen 408 responsive to user contact/touches 502 and a media player 404. The media player plays/displays media files 302 (such as video or audio files) and enables a user to interact with the content being played. In some embodiments the media player includes media controls 306 that a user operates directly (via touch) to select tracks and fast forward, rewind, pause or stop playback of the media file 302, among other operations. When displayed on a touch screen 408, all or a portion of the media player window can function as a touch sensitive area 304. The present invention utilizes this characteristic of the touch screen 408 to permit a user to issue variable rate scan gestures on any part of this touch sensitive area 304 and does not restrict the user to interaction solely with the touch screen area corresponding to the displayed media controls 306.

FIG. 3B illustrates an electronic device 400B (a laptop in this illustration) that does not include a touch screen 408. Instead, the device 400B includes a touch pad 310 and a separate display 320 on which the media player 404 window is shown and media files 302 played/displayed. The media controls 306 are shown on the display, but the user operates the controls using the touch pad 310. In some (but not all) embodiments, the touch pad 310 is responsive to user variable rate scan gestures as long as the on-screen cursor or other indicator controlled by the touch pad 310 is inside the active window of the media player (referred to as having "focus" on the media player). Thus, the user is free to initiate variable rate scan operations from practically any on-screen cursor position and is not required to interact (at least for the variable rate scan operation) with the relatively small area corresponding to the media controls.

Variable Rate Scan Illustrations

Figure 4A:
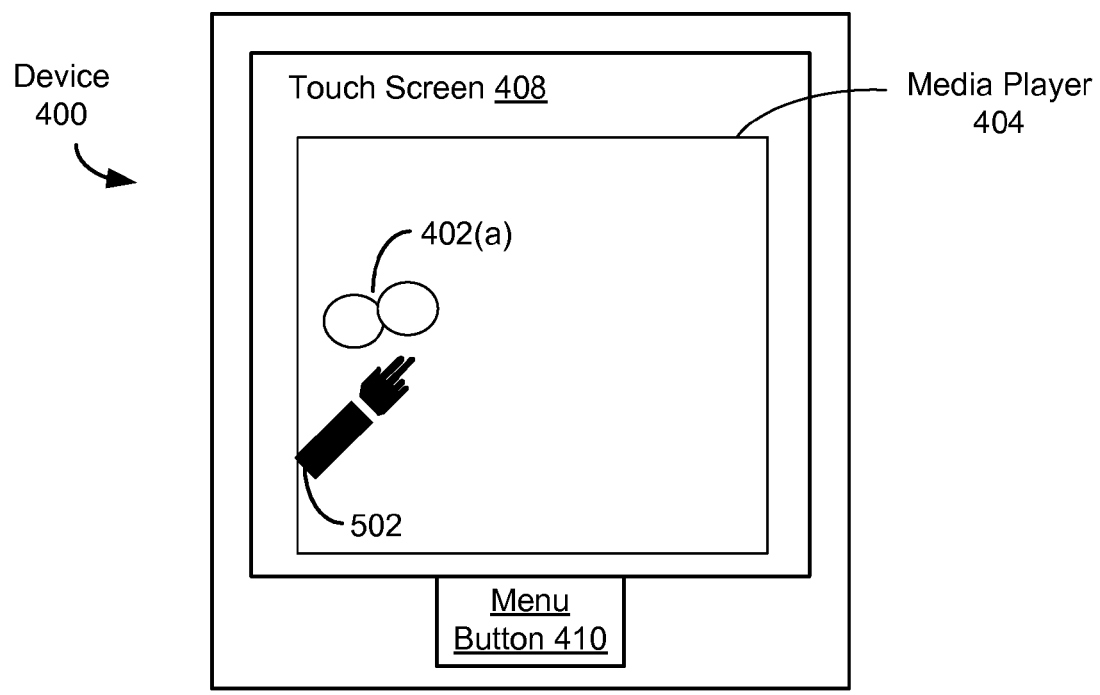
FIGS. 4A-4F illustrate the display of a device at various points of a variable rate scan action, according to some embodiments where swipe gestures are used to control scan rate.
Figure 4B:
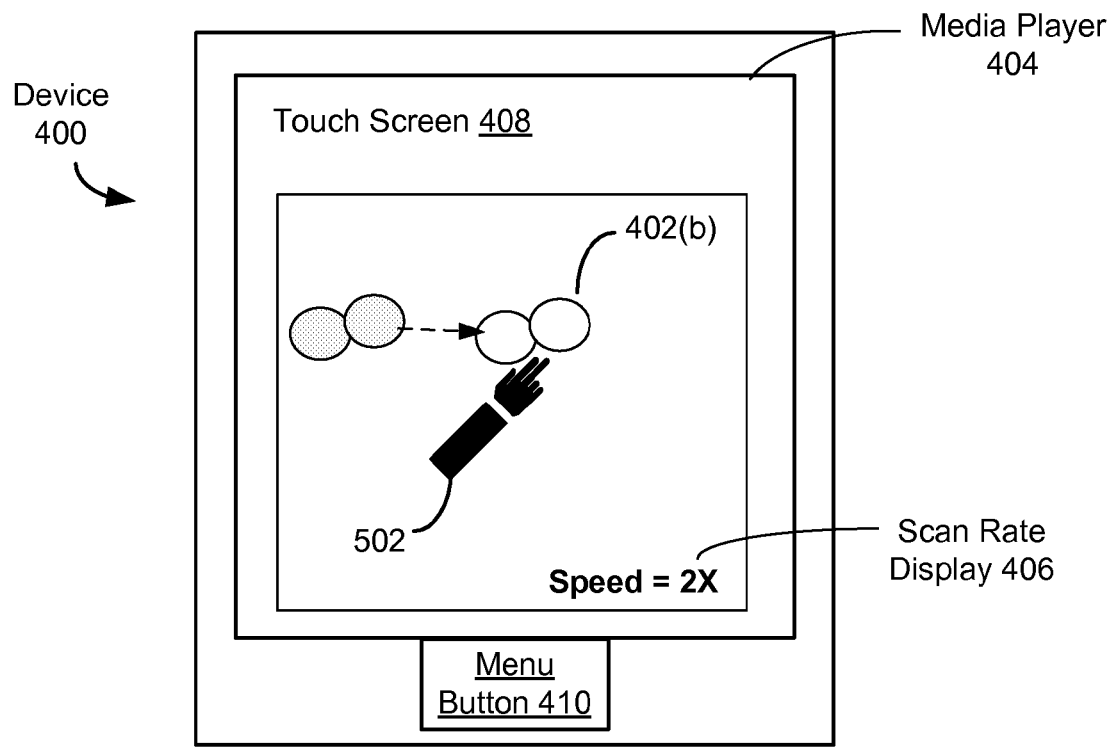

FIGS. 4A-4F illustrate the display of a device at various points of a variable rate scan action, according to some embodiments where swipe gestures are used to control scan rate. While it is not shown in these figures or other illustrations herein, it is presumed that a media file is playing in the media player 404 during the illustrated actions. FIGS. 4A and 4B show how, in one embodiment, a user initiates a variable rate scan operation. In the first step, the user 502 contacts the media player window 404 of the touch screen 408 (position on the window 404 is not important) with two closely spaced finger tips, shown as the two circular shapes 402(a). As shown in FIG. 4B, without breaking contact, the user swipes their two finger tips from left to right (to new location 402(b) on the touch screen 408). (In these and other drawings, the old touch positions are shown using gray shading.) In this embodiment, the two fingered touch and swipe is recognized by the device 400 as a gesture to initiate a variable rate scan operation, so, in response, the device 400 increases the scan rate to 2× normal speed. The new scan rate is optionally displayed on the touch screen 406 to provide user feedback. Note that the direction of the swipe could be to the left or the right, the effect of this difference being to determine whether the scan action initially proceeds in the forward or reverse direction.

Figure 4C:
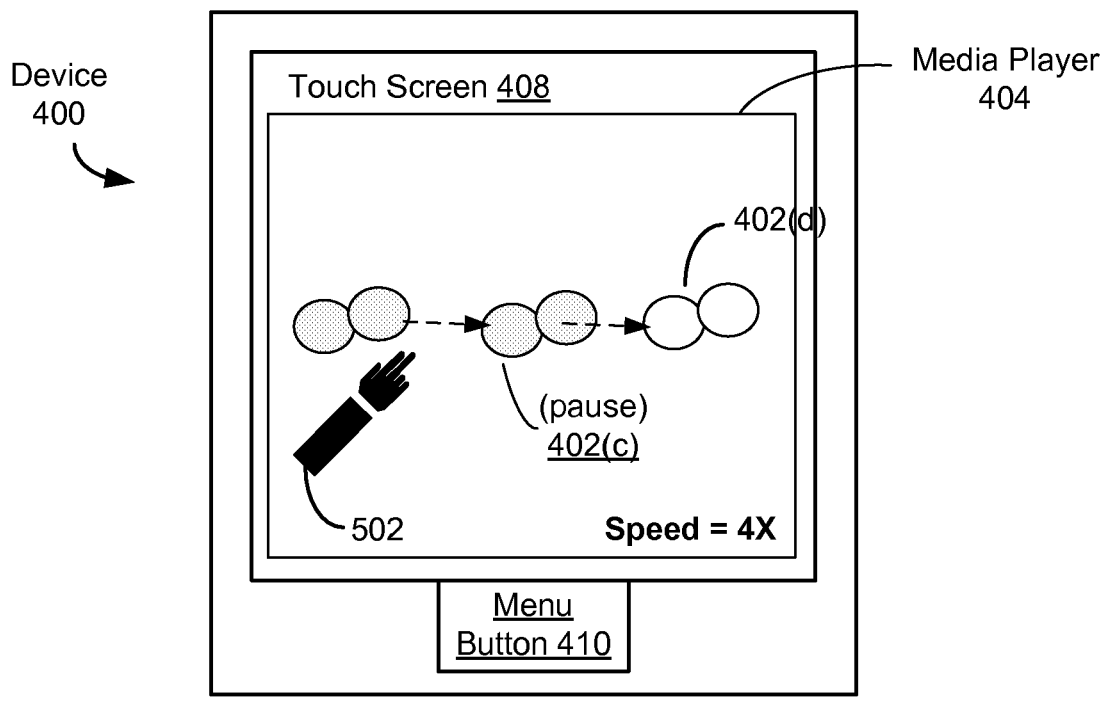

FIG. 4C illustrates the situation after the user makes a second, connected two-finger gesture to the right, starting after a pause 402(c) in the first gesture and finishing at position 402(d). In response, the device 400 increases the scan rate to 4× normal speed.

Figure 4D:
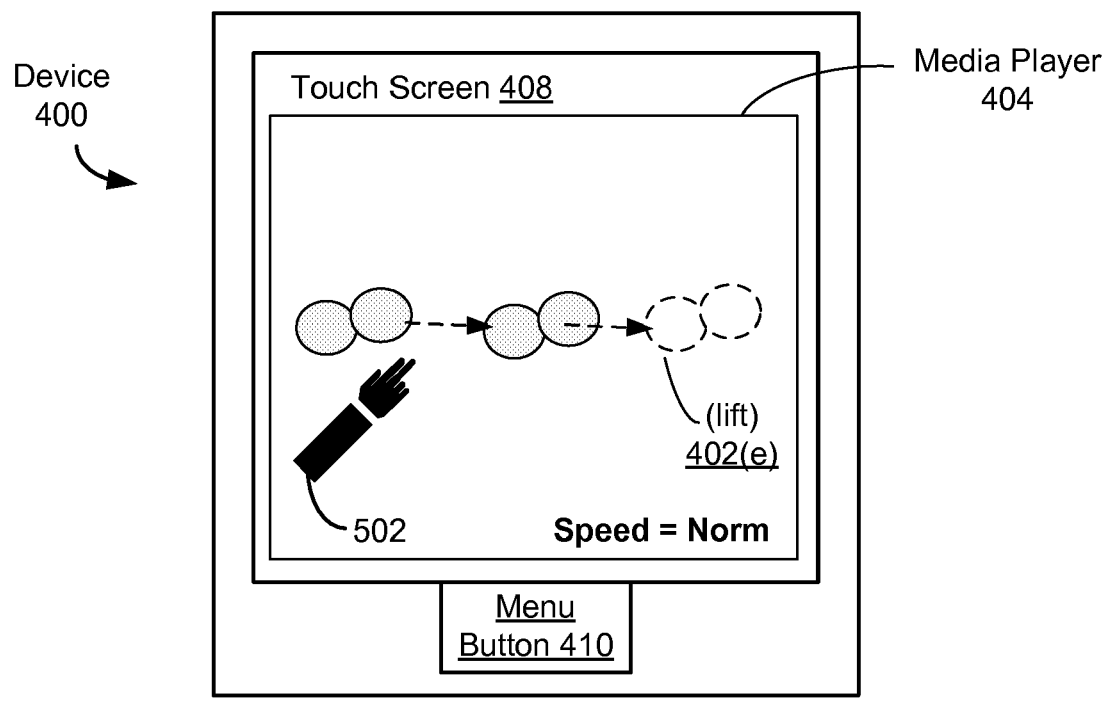

FIG. 4D illustrates the situation after the user lifts their fingertips, shown as the dashed circular shapes 402(e), which the device 400 in this embodiment recognizes as a request to terminate the scan operation. As a result, the device returns playback speed of the media file to normal (shown here as "Speed=Norm").

Figure 4E:
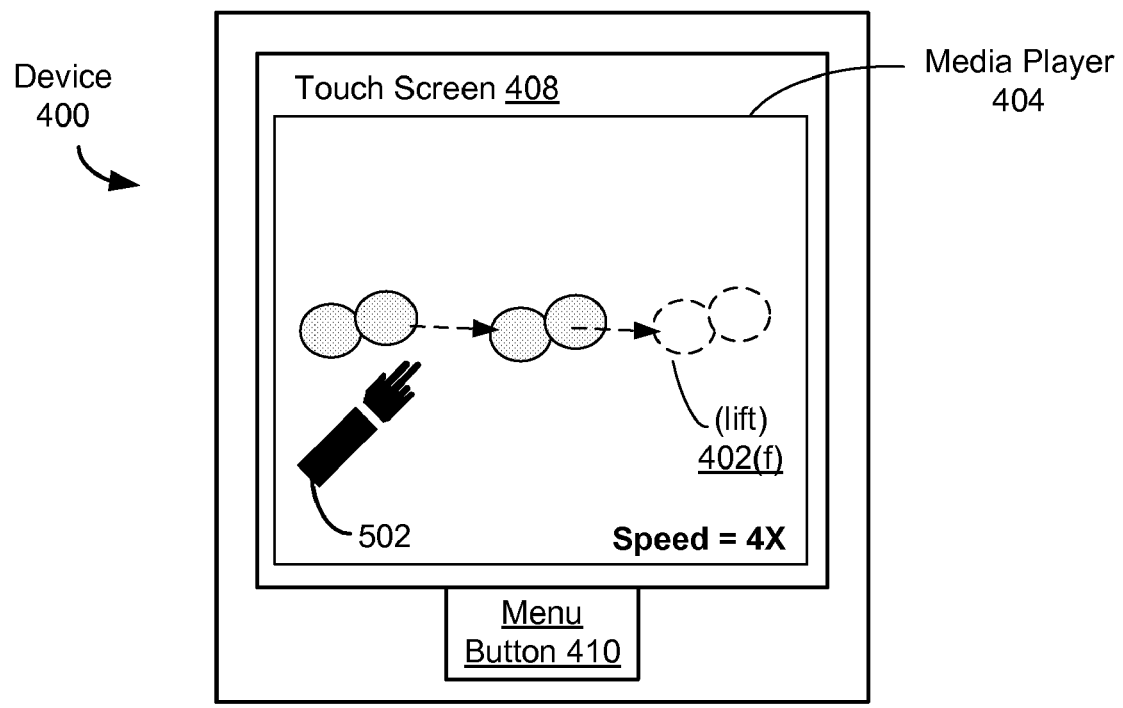
Figure 4F:
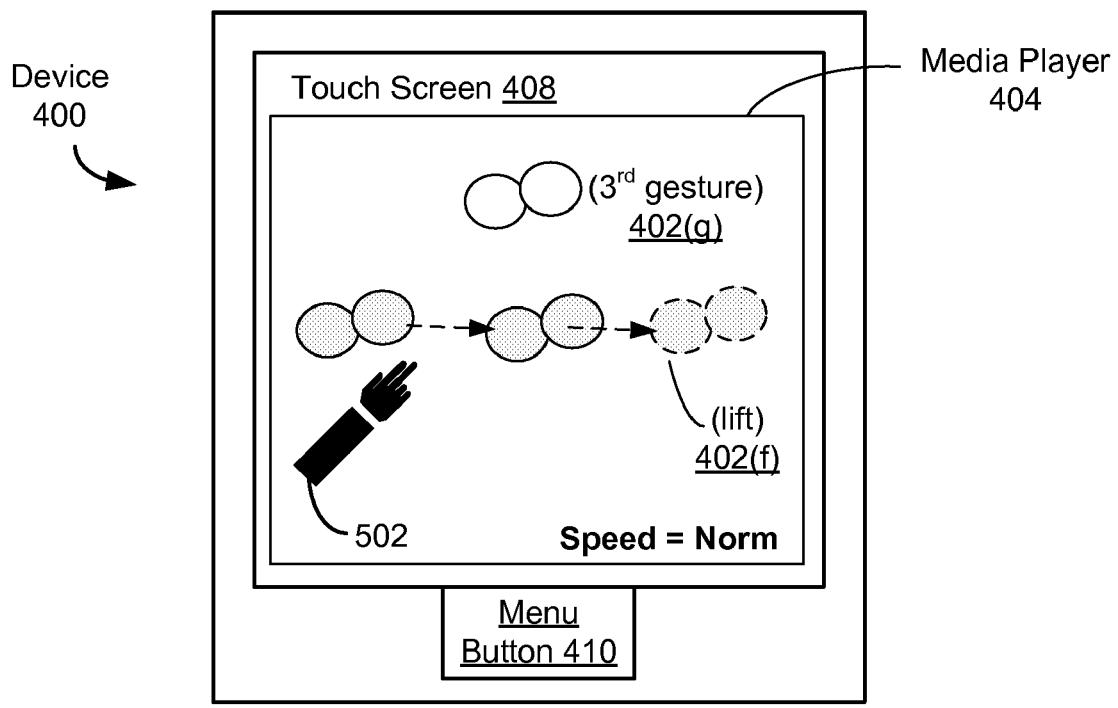

FIGS. 4E and 4F illustrate actions in a different embodiment, where the device 400 construes a finger lift 402(f) during a scan action as a request by the user to maintain the media scan at its current accelerated rate. As a result, the device 400 maintains the scan rate at 4× normal speed. In FIG. 4F the user indicates their desire to stop the media scan by issuing a particular gesture associated with that purpose (which could be a multi-finger gesture or any other kind of gesture). In this embodiment, the user makes a two-finger tap 402(g) on the media player window 404, in response to which the device 400 returns playback speed of the media file to normal.

Figure 5A:
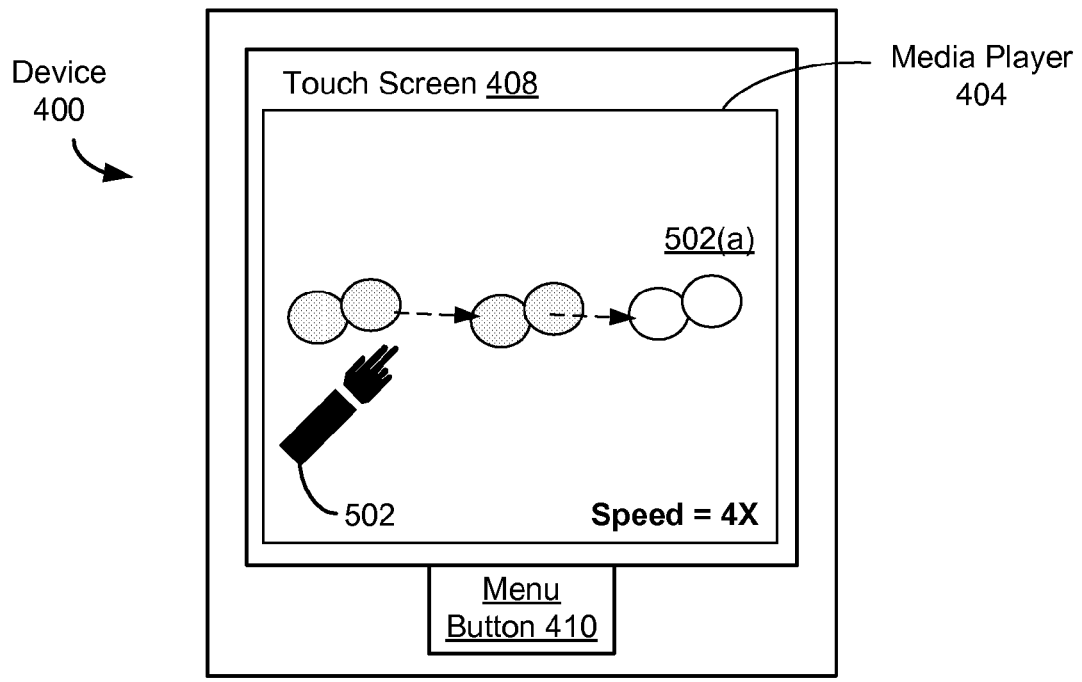
FIGS. 5A-5D illustrate the display of a device at various points of a variable rate scan action according to some embodiments where reverse swipe gestures are used to control scan rate and/or direction.
Figure 5B:
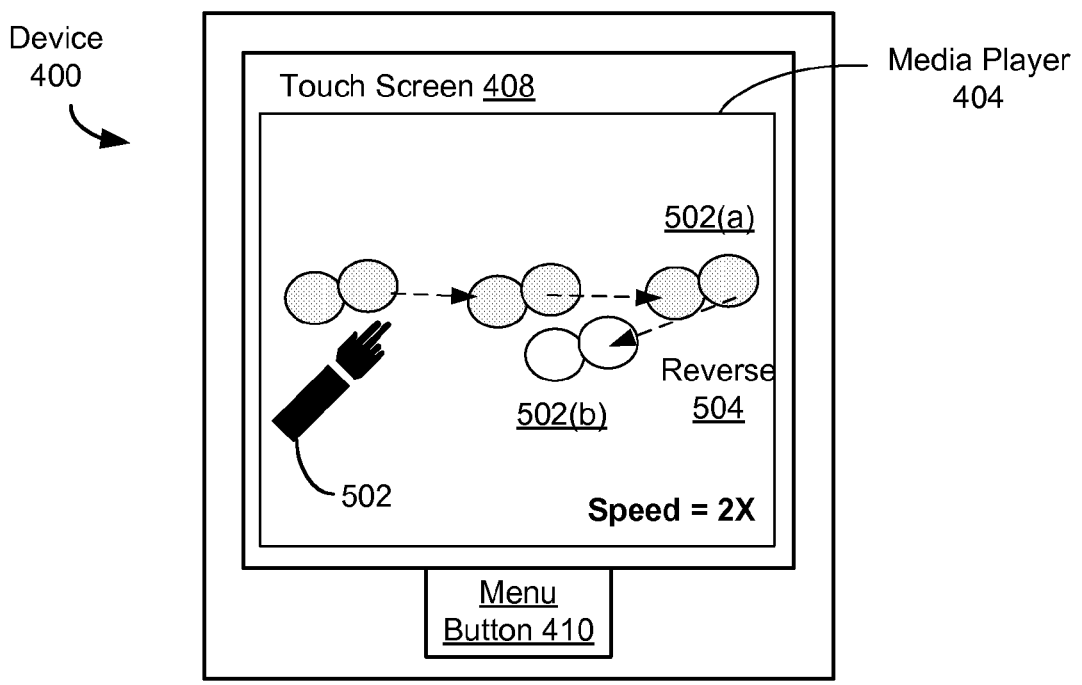

FIGS. 5A-5D illustrate the display of a device at various points of a variable rate scan action according to some embodiments where reverse swipe gestures are used to control scan rate and/or direction. FIGS. 5A and 5B illustrate an embodiment where, in response to reversing the direction of a series of connected gestures, the device 400 slows the scan rate in its current playback direction. (Not shown on this figure, if the series of reverse connected gestures is continued, the device 400 will ultimately slow the playback speed to normal, reverse (504) the direction of playback and then increase scan/playback speed in the reverse direction). Thus, in FIG. 5A the user has issued two connected swipes, ending at position 502(*a*), causing the scan rate to go to 4×. At this point, as shown in FIG. 5B, the user issues a connected swipe in the opposite direction, ending at the position 502(*b*), causing the device 400 to reduce the scan rate to 2×.

FIGS. 5A and 5B illustrate an embodiment where, in response to reversing the direction of a series of connected gestures, the device 400 reverses and begins to scan in the opposite playback direction. Thus, as in FIG. 5A the user has issued two connected swipes, ending at position 502(*d*), causing the scan rate to go to 4×. At this point, as shown in FIG. 5B, the user issues a connected swipe in the opposite direction, ending at the position 502(*b*), causing the device 400 to start reverse scan at a predetermined scan rate factor; e.g., −2× as shown (twice normal speed in reverse direction). In FIG. 5B, the user issues an additional two-finger swipe to the left starting at position 502(*e*) and ending at position 502(*f*). In response, the device 400 increases the reverse scan rate to −4×.

Figure 6A:
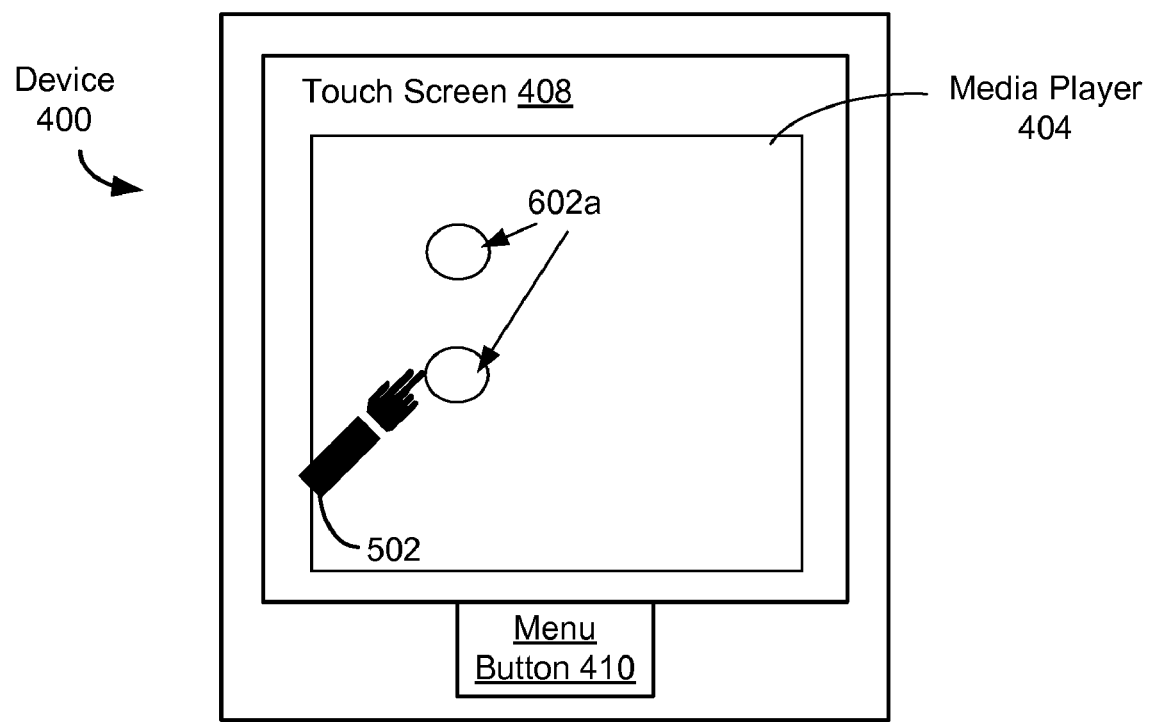
FIGS. 6A-6D illustrate the display of a device at various points of a variable rate scan action, according to some embodiments that employ a rotational gesture movement.
Figure 6B:
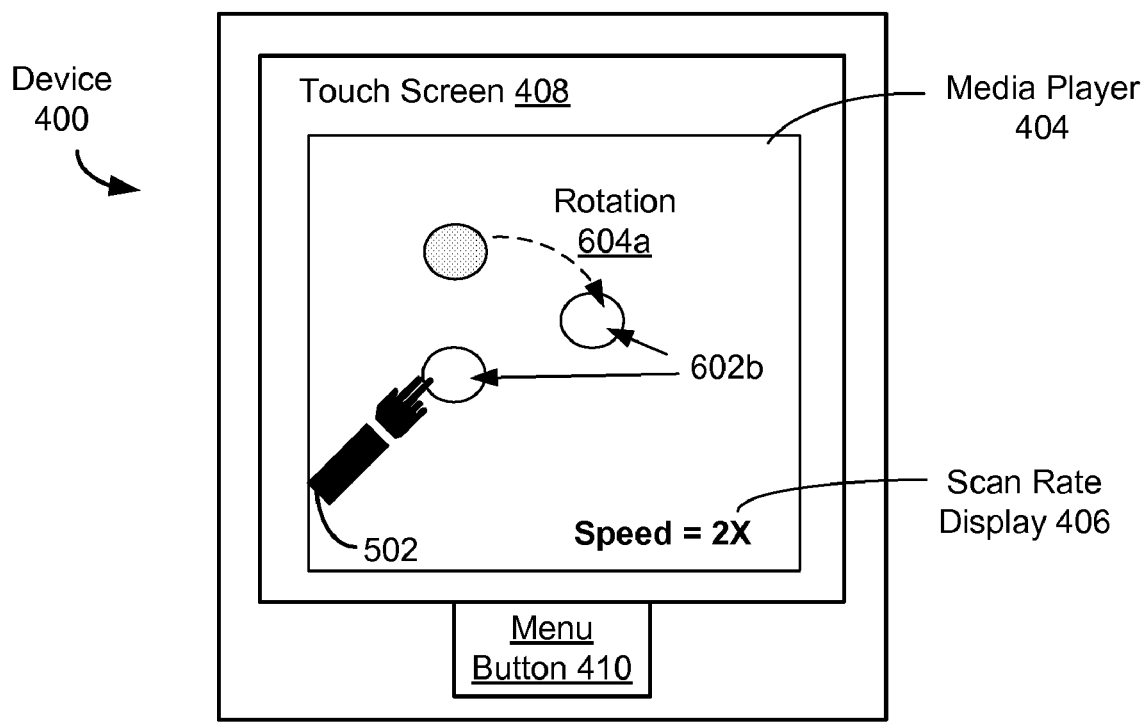

FIGS. 6A-6D illustrate the display of a device at various points of a variable rate scan action, according to some embodiments that employ a rotational gesture movement. In the first step, shown in FIG. 6A, the user 502 contacts the media player window 404 of the touch screen 408 (position on the window 404 is not important) with two separated finger tips, shown as the two circular shapes 602*a*. As shown in FIG. 6B, without breaking contact the user rotates 604*a* her finger tips to a new position 602(*b*). In this embodiment, the two fingered touch and rotation is recognized by the device 400 as a gesture to initiate a variable rate scan operation, so, in response, the device 400 increases the scan rate to 2× normal speed. The new scan rate is optionally displayed on the touch screen 406 to provide user feedback. Note that the direction of the rotation could be to the left or the right, the effect of this difference being to determine whether the scan action initially proceeds in the forward or reverse direction.

Figure 6C:
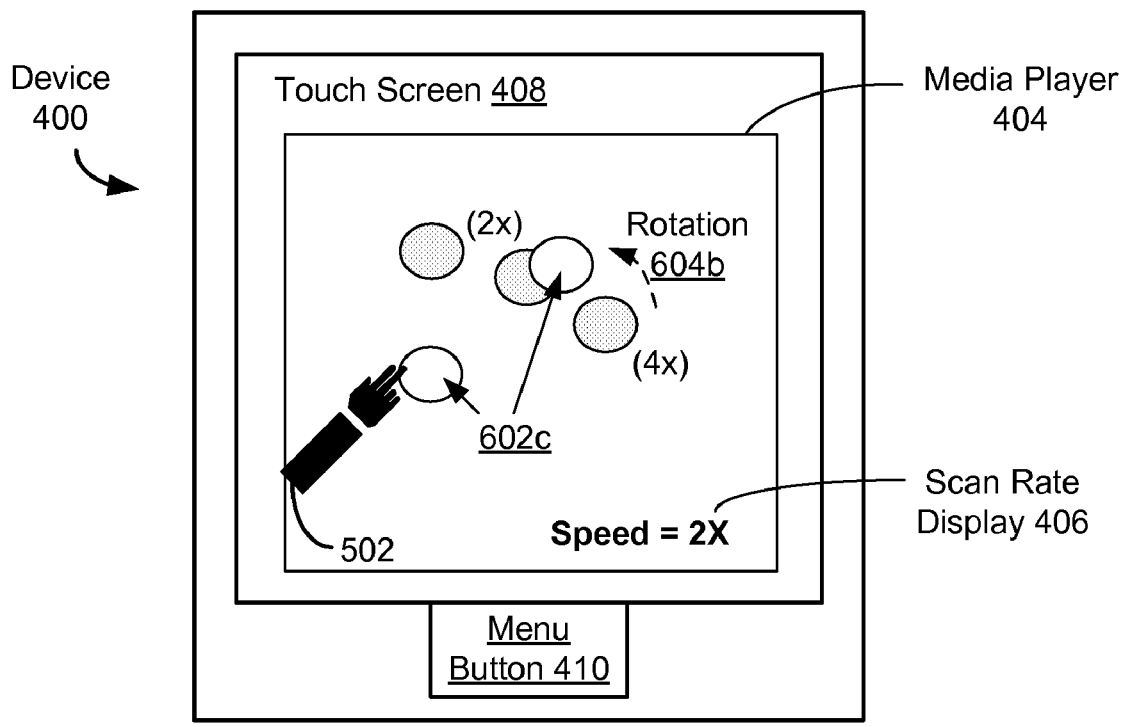
Figure 6D:
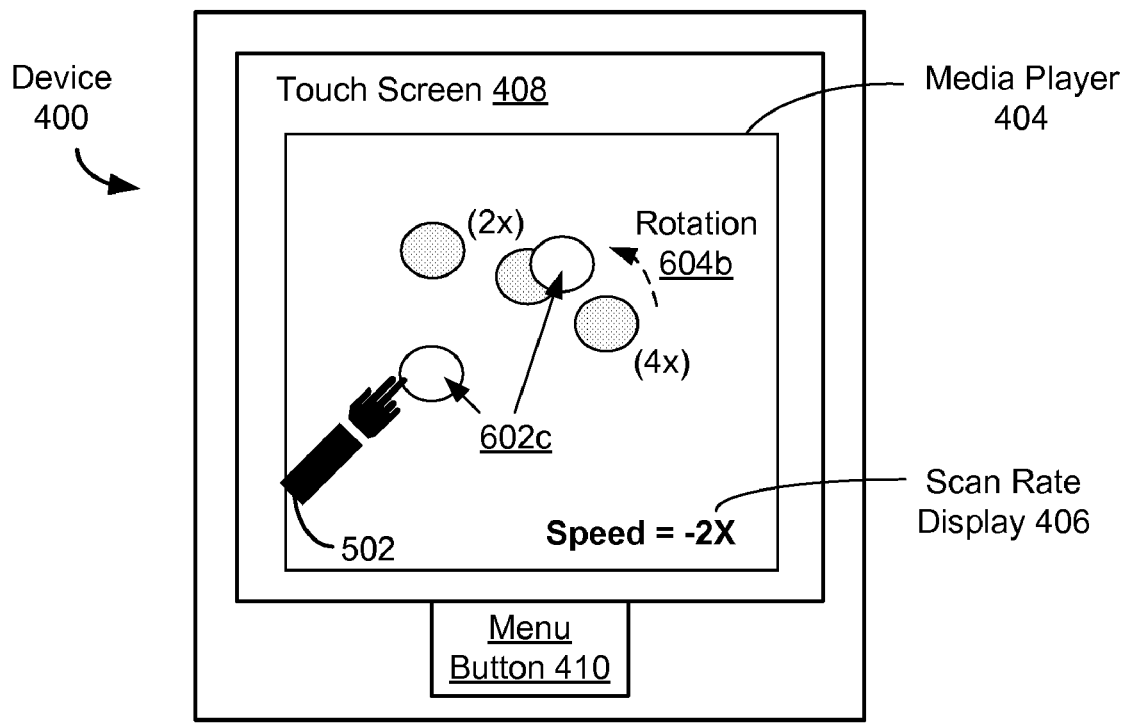

FIGS. 6C and 6D illustrate the effect of a user issuing a gesture in a reverse rotational direction 604*b* according to different embodiments. In the embodiment shown in FIG. 6C, the effect is similar to that described with reference to FIGS. 5A and 5B, where the reverse gesture initially slows media playback speed in the current playback direction (whether that is backwards or forwards). Thus, after increasing scan rate to 4× through two connected rotation gestures, the user issues a new rotation gesture in the reverse direction, ending at position 602(*c*), causing the device to slow forward playback speed to 2×.

Figure 5C:
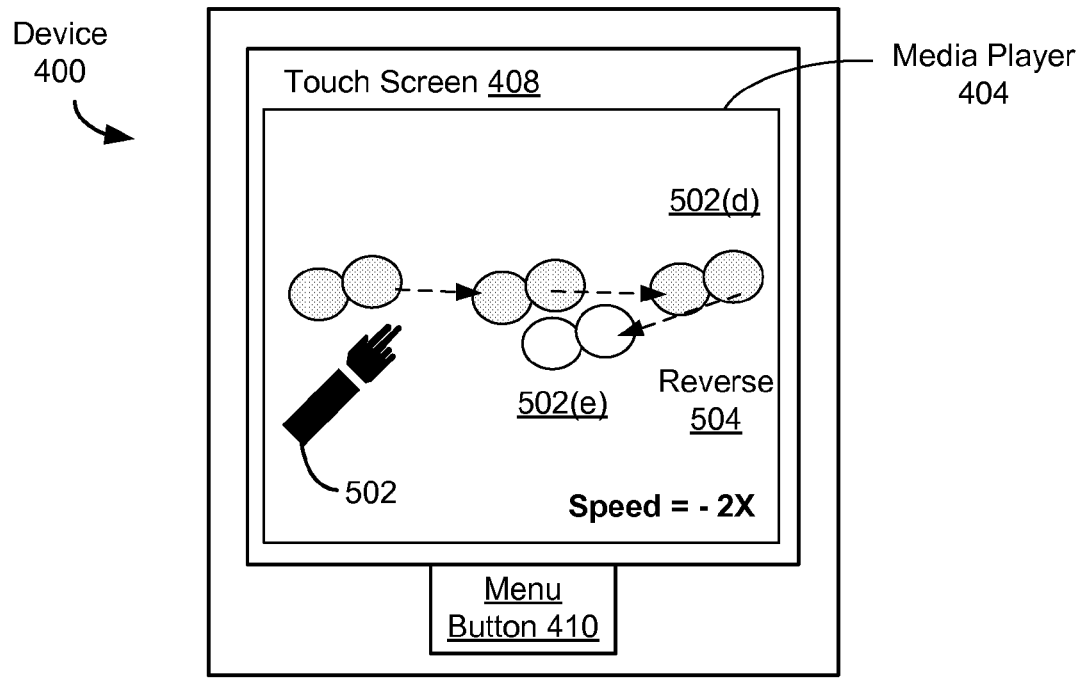
Figure 5D:
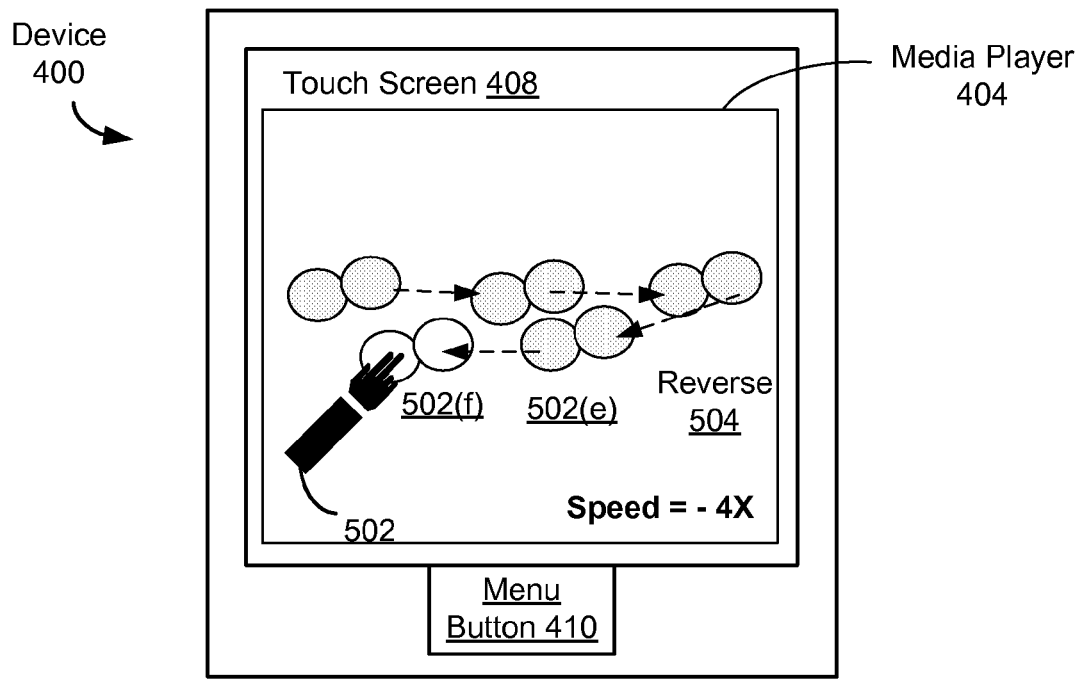

In contrast, in the embodiment shown in FIG. 6D, the effect is similar to that described with reference to FIGS. 5C and 5D, where the reverse gesture initiates accelerated scan in a direction that is opposite the current playback direction (whether that is backwards or forwards). Thus, after increasing scan rate to 4× through two connected rotation gestures, the user issues a new rotation gesture in the reverse direction, causing the device to start reverse scan at a scan rate factor of −2×.

Additional Variable Rate Scan Methods

Figure 7A:
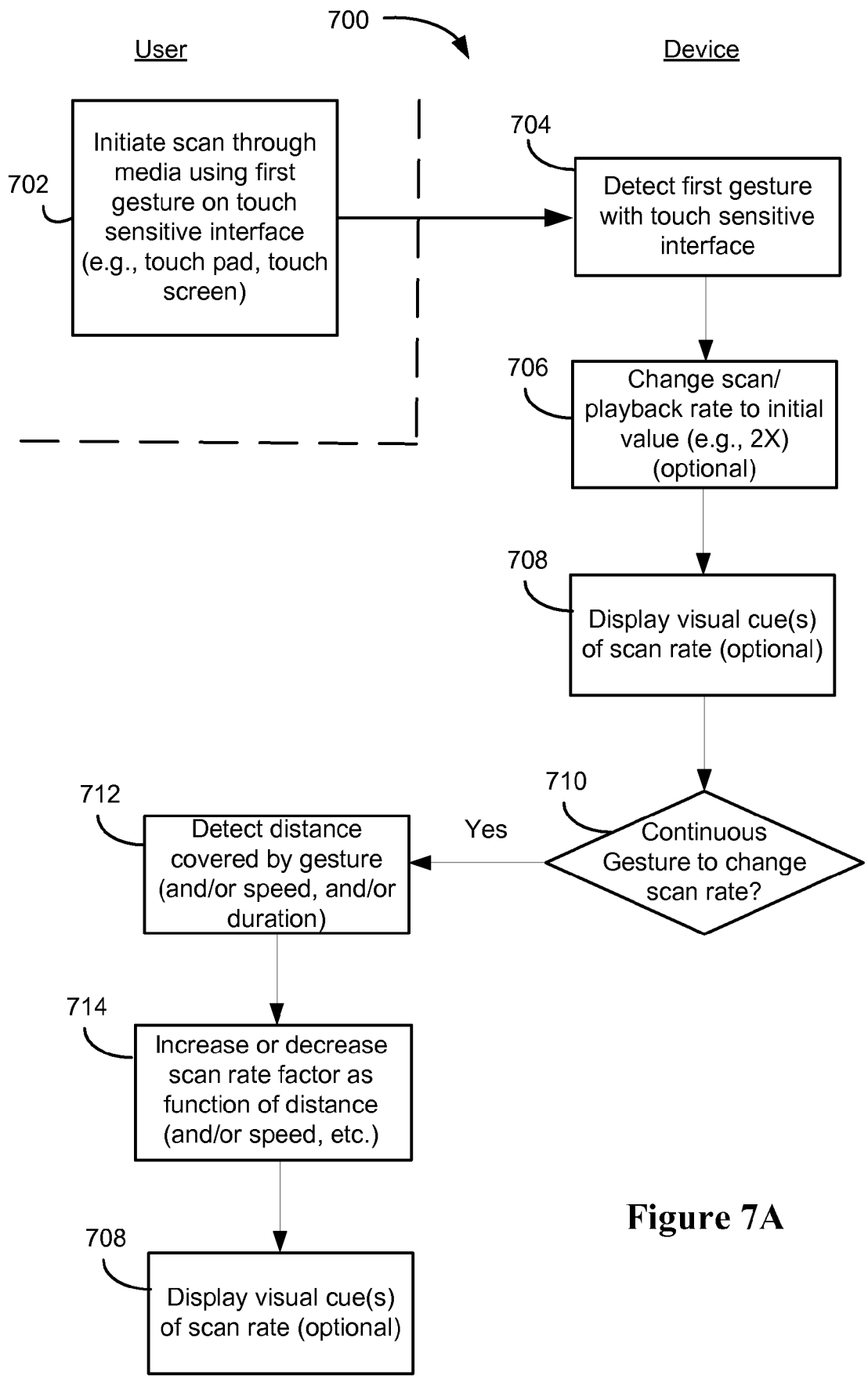
FIGS. 7A-7B are flow diagrams illustrating a process for providing variable rate media playback/scan using a touch sensitive interface, according to some embodiments where the scan rate is determined by the length and/or speed and/or duration of a linear gestures (FIG. 7A) or angle and/or speed and/or duration of a rotational gesture (FIG. 7B).
Figure 7B:
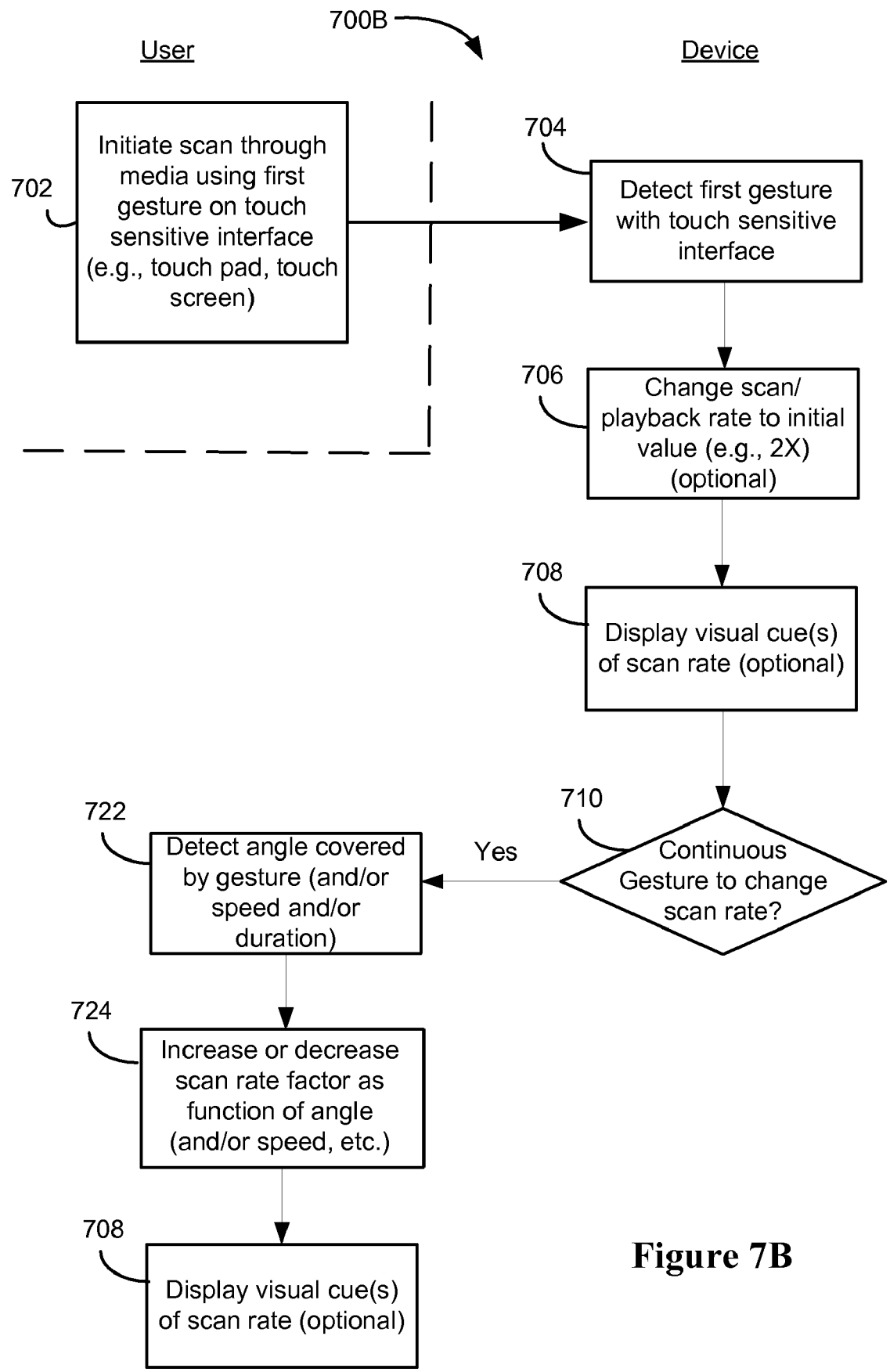

FIGS. 7A-7B are flow diagrams illustrating a process for providing variable rate media playback/scan using a touch sensitive interface, according to some embodiments where the scan rate is determined by the length and/or speed and/or duration of a linear gestures (FIG. 7A) or angle and/or speed and/or duration of a rotational gesture (FIG. 7B). The processes are similar to those described in FIGS. 2A and 2B, and can be implemented in the media playback gesture processing module 150, described in reference to FIG. 1A. The process steps described with reference to these figures are attributed to action of a user (shown to the left and above the dashed line) or to a device 100, generally under the control of the media playback gesture processing module 150. Due to the similarity to processes described in reference to FIGS. 2A and 2B (e.g., 704, 706, and 708 in FIGS. 7A and 7*b* are similar to 204, 206, and 208 in FIG. 2), only differences from those processes are described below.

Referring to FIG. 7A, the process 700 begins when a user initiates a variable rate scan operation by issuing a first gesture on the touch interface that is associated with a variable scan rate operation (702). In this process, a user initiates a variable scan rate action with a first gesture (such as a two fingered touch) (702) and then proceeds with a continuous gesture, the distance, speed, and/or duration of which determines the speed of the resulting scan action (as mentioned above, this gesture is exemplary and not limiting). If the device identifies the first and continuous gesture as characteristic of a request to change scan rate (710—Yes) the device detects a physical characteristic of the gesture, such as the distance covered by the gesture and/or the speed of the gesture and/or the time duration of the gesture's contact with the touch interface (712). In response, the device increases or decreases the scan rate factor as a function of the physical characteristic (714). The function result (i.e., scan rate factor or playback speed) can be determined from one or more of the physical characteristics using computational formulas, lookup employing acceleration curves, or lookup employing a programmed set of scan rate factors, to name a few possibilities.

The process 700B shown in FIG. 7B is similar to that described in reference to FIG. 7A, the main difference being that the scan rate gesture is a continuous rotational gesture. Consequently, in steps 722 and 724, the attributes of the rotational gesture that determine the resulting scan rate include the rotation angle of the gesture (similar to distance as employed in the process of FIG. 7A) and/or the speed and/or duration of the rotational gesture.

While the processes of FIGS. 7A and 7B have been described for continuous gestures, the calculation of scan rates as a function of some physical characteristic of the gesture is equally applicable to connected gestures. That is, in a series of connected gestures, the change in scan rate corresponding to each gesture can be determined by the characteristics of a respective one of the connected gestures.

Figure 8A:
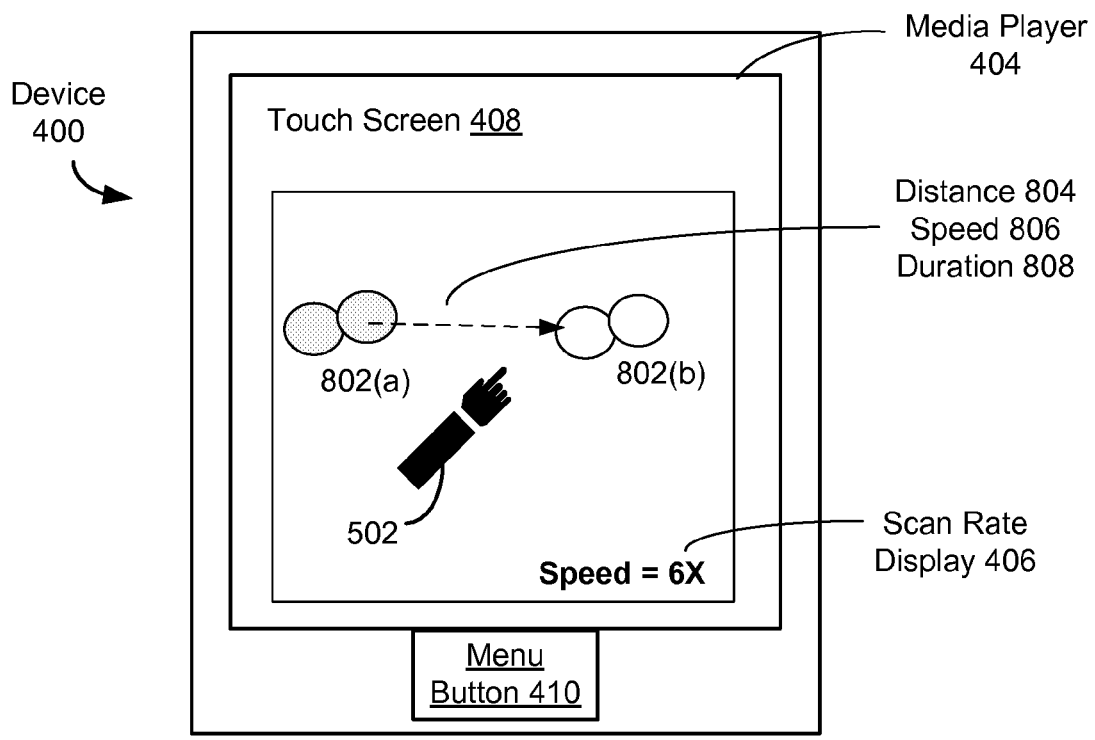
FIGS. 8A-8B illustrate the display of a device at various points of a variable rate scan action according to some embodiments described with reference to FIGS. 7A and 7B.
Figure 8B:
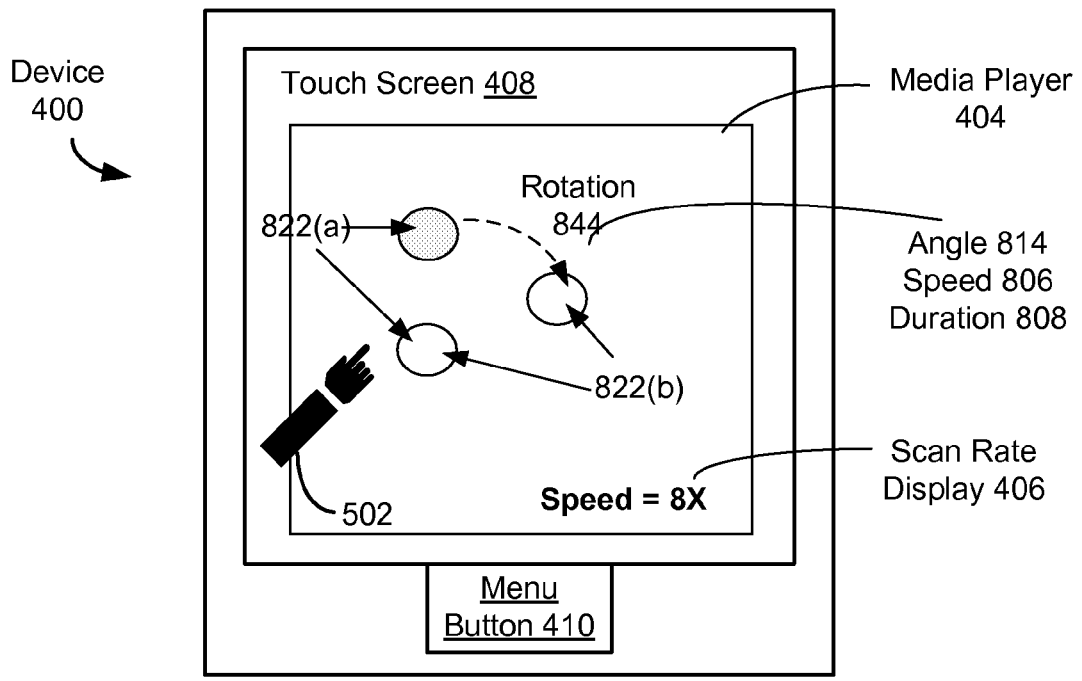

FIGS. 8A-8B illustrate the display of a device at various points of a variable rate scan action, according to some embodiments described with reference to FIGS. 7A and 7B. FIG. 8A illustrates a continuous, linear gesture from position 802(*a*) to 802(*b*) with a characteristic distance 804, speed 806 and duration of contact 808 on the touch screen. The device 400 can use any combination of these characteristics to arrive at the resulting scan rate (e.g., in this case, 6× normal playback rate). FIG. 8B illustrates a continuous, rotational gesture from position 822(*a*) to 822(*b*) via a rotation 844 with a characteristic angular distance 814, speed 806 and duration of contact 808 on the touch screen. The device 400 can use any combination of these characteristics to arrive at the resulting scan rate (e.g., in this case, 8× normal playback rate).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at an electronic device with a touch interface and a media player:
   while a media file is playing in the media player:
   detecting a first user gesture on the touch interface, wherein the first user gesture is associated with a request to vary scan rate through the media file;
   in response to the first user gesture, changing playback speed of the media file by a first scan rate factor from a first playback speed to a second playback speed;
   after detecting the first gesture, detecting a pause without cessation in user contact with the touch interface;
   maintaining the second playback speed during the pause;
   after detecting the pause, detecting a second user gesture on the touch interface, wherein the second user gesture includes a multi-finger swipe motion, executed after the pause without cessation in user contact with the touch interface throughout the first gesture, the second gesture, and the pause, wherein the second user gesture is also associated with a request to vary scan rate through the media file; and
   in response to the second user gesture, changing playback speed of the media file by an additional second scan rate factor to a third playback speed, distinct from the first playback speed and the second playback speed.

2. The method of claim 1, wherein the first and second scan rate factors are determined by length and/or speed and/or time duration of the first and second user gestures, respectively.

3. The method of claim 1, further comprising:
   detecting cessation of user contact with the touch interface; and
   in response to the cessation, returning the playback speed of the media file to the first playback speed.

4. The method of claim 1, further comprising:
   detecting cessation of user contact with the touch interface; and
   maintaining the playback speed of the media at a first playback speed existing just prior to the cessation.

5. The method of claim 4, further comprising:
   detecting a third user gesture on the touch interface, wherein the third user gesture is associated with a request to cancel accelerated playback of the media file; and
   in response to the third user gesture, returning the playback speed of the media file to the first playback speed.

6. The method of claim 1, wherein the first user gesture comprises a multi-finger swipe motion.

7. The method of claim 1, wherein, when the first user gesture occurs when the media file is playing at a conventional playback speed, the first scan rate factor is two times the conventional playback speed, and the second scan rate factor is two times the playback speed of the media file just prior to occurrence of the second user gesture.

8. The method of claim 1, wherein the first scan rate factor is a fixed multiple of the playback speed of the media file just prior to occurrence of the first user gesture and the second scan rate factor is a fixed multiple of the playback speed of the media file just prior to occurrence of the second user gesture.

9. The method of claim 1, wherein the first and second user gestures are two fingered swipes, both of the swipes having respective swipe trajectories that are approximately aligned with a predetermined orientation on the touchpad.

10. The method of claim 9, further comprising:
    detecting a first direction of the first user gesture and a second direction of the second user gesture with reference to the predetermined orientation, and
    when the first and second user gestures are in substantially opposite directions with reference to the predetermined orientation, reversing direction of playback of the media file in response to the second gesture.

11. The method of claim 9, further comprising:
    detecting a first direction of the first user gesture and a second direction of the second user gesture with reference to the predetermined orientation, and
    when the first and second user gestures are in substantially opposite directions with reference to the predetermined orientation, slowing playback speed in its current direction.

12. The method of the claim 9, wherein, when the first and second user gestures are in a different direction along the predetermined orientation, the second predetermined rate change comprises changing the playback speed to the speed of playback for the media file prior to implementation of the first rate change.

13. A non-transitory computer readable storage medium comprising instructions, which when executed by a portable electronic device with a touch interface and a media player, cause the device to:
    while a media file is playing in the media player:
    detect a first user gesture on the touch interface, wherein the first user gesture is associated with a request to vary scan rate through the media file;
    in response to the first user gesture, change playback speed of the media file by a first scan rate factor from a first playback speed to a second playback speed;
    after detecting the first gesture, detecting a pause without cessation in user contact with the touch interface;
    maintaining the second playback speed during the pause;
    after detecting the pause, detect a second user gesture on the touch interface, wherein the second user gesture includes a multi-finger swipe motion executed after the pause without cessation in user contact with the touch interface throughout the first gesture, the second gesture, and the pause, wherein the second user gesture is also associated with a request to vary scan rate through the media file; and
    in response to the second user gesture, change playback speed of the media file by an additional second scan rate factor to a third playback speed, distinct from the first playback speed and the second playback speed.

14. An electronic device, comprising:
    a touch interface;
    a media player; and
    a contact processing module that detects and processes user inputs on the touch interface, wherein the electronic device, in conjunction with the contact processing module, is configured to:
    while a media file is playing in the media player:
    detect a first user gesture on the touch interface, wherein the first user gesture is associated with a request to vary scan rate through the media file;

in response to the first user gesture, change playback speed of the media file in the media player by a first scan rate factor from a first playback speed to a second playback speed;

after detecting the first gesture, detect a pause without cessation in user contact with the touch interface;

maintain the second playback speed during the pause;

after detecting the pause, detect a second user gesture on the touch interface, wherein the second user gesture includes a multi-finger swipe motion executed after the pause without cessation in user contact with the touch interface throughout the first gesture, the second gesture, and the pause, wherein the second user gesture is also associated with a request to vary scan rate through the media file in the media player; and in response to the second user gesture, change playback speed of the media file by an additional second scan rate factor in the media player to a third playback speed, distinct from the first playback speed and the second playback speed.

15. The device of claim 14, wherein the first and second scan rate factors are determined by length and/or speed and/or time duration of the first and second user gestures, respectively.

16. The device of claim 14, including instructions for:
detecting cessation of user contact with the touch interface; and
in response to the cessation, returning the playback speed of the media file to the first playback speed.

17. The device of claim 14, including instructions for:
detecting cessation of user contact with the touch interface; and
maintaining the playback speed of the media at a playback speed existing just prior to the cessation.

18. The device of claim 14, including instructions for:
detecting a third user gesture on the touch interface, wherein the third user gesture is associated with a request to cancel accelerated playback of the media file; and
in response to the third user gesture, returning the playback speed of the media file to the first playback speed.

19. The device of claim 14, wherein the first user gesture comprises a multi-finger swipe motion.

20. The device of claim 14, wherein, when the first user gesture occurs when the media file is playing at a conventional playback speed, the first scan rate factor is two times the conventional playback speed, and the second scan rate factor is two times the playback speed of the media file just prior to occurrence of the second user gesture.

21. The device of claim 14, wherein the first scan rate factor is a fixed multiple of the playback speed of the media file just prior to occurrence of the first user gesture and the second scan rate factor is a fixed multiple of the playback speed of the media file just prior to occurrence of the second user gesture.

22. The device of claim 14, wherein the first and second user gestures are two fingered swipes, both of the swipes having respective swipe trajectories that are approximately aligned with a predetermined orientation on the touchpad.

23. The device of claim 14, including instructions for:
detecting a first direction of the first user gesture and a second direction of the second user gesture with reference to the predetermined orientation, and
when the first and second user gestures are in substantially opposite directions with reference to the predetermined orientation, reversing direction of playback of the media file in response to the second gesture.

24. The device of claim 14, including instructions for:
detecting a first direction of the first user gesture and a second direction of the second user gesture with reference to the predetermined orientation, and
when the first and second user gestures are in substantially opposite directions with reference to the predetermined orientation, slowing playback speed in its current direction.

25. The device of claim 14, wherein, when the first and second user gestures are in a different direction along the predetermined orientation, the second predetermined rate change comprises changing the playback speed to the speed of playback for the media file prior to implementation of the first rate change.

26. The computer readable storage medium of claim 13, wherein the first and second scan rate factors are determined by length and/or speed and/or time duration of the first and second user gestures, respectively.

27. The computer readable storage medium of claim 13, including instructions which cause the device to:
detect cessation of user contact with the touch interface; and
in response to the cessation, return the playback speed of the media file to the first playback speed.

28. The computer readable storage medium of claim 13, including instructions which cause the device to:
detect cessation of user contact with the touch interface; and
maintain the playback speed of the media at a playback speed existing just prior to the cessation.

29. The computer readable storage medium of claim 13, including instructions which cause the device to:
detect a third user gesture on the touch interface, wherein the third user gesture is associated with a request to cancel accelerated playback of the media file; and
in response to the third user gesture, return the playback speed of the media file to the first playback speed.

30. The computer readable storage medium of claim 13, wherein the first user gesture comprises a multi-finger swipe motion.

31. The computer readable storage medium of claim 13, wherein, when the first user gesture occurs when the media file is playing at a conventional playback speed, the first scan rate factor is two times the conventional playback speed, and the second scan rate factor is two times the playback speed of the media file just prior to occurrence of the second user gesture.

32. The computer readable storage medium of claim 13, wherein the first scan rate factor is a fixed multiple of the playback speed of the media file just prior to occurrence of the first user gesture and the second scan rate factor is a fixed multiple of the playback speed of the media file just prior to occurrence of the second user gesture.

33. The computer readable storage medium of claim 13, wherein the first and second user gestures are two fingered swipes, both of the swipes having respective swipe trajectories that are approximately aligned with a predetermined orientation on the touchpad.

34. The computer readable storage medium of claim 13, including instructions which cause the device to:
detect a first direction of the first user gesture and a second direction of the second user gesture with reference to the predetermined orientation, and
when the first and second user gestures are in substantially opposite directions with reference to the predetermined orientation, reverse direction of playback of the media file in response to the second gesture.

35. The computer readable storage medium of claim 13, including instructions which cause the device to:
- detect a first direction of the first user gesture and a second direction of the second user gesture with reference to the predetermined orientation, and
- when the first and second user gestures are in substantially opposite directions with reference to the predetermined orientation, slow playback speed in its current direction.

36. The computer readable storage medium of claim 13, wherein, when the first and second user gestures are in a different direction along the predetermined orientation, the second predetermined rate change comprises changing the playback speed to the speed of playback for the media file prior to implementation of the first rate change.

\* \* \* \* \*

UNITED STATES PATENT AND TRADEMARK OFFICE
CERTIFICATE OF CORRECTION

PATENT NO. : 8,405,621 B2
APPLICATION NO. : 12/240974
DATED : March 26, 2013
INVENTOR(S) : Samir B. Gehani et al.

Page 1 of 1

It is certified that error appears in the above-identified patent and that said Letters Patent is hereby corrected as shown below:

In the Claims:

In column 15, line 49, delete "first".

Signed and Sealed this
Fourteenth Day of May, 2013

Teresa Stanek Rea
*Acting Director of the United States Patent and Trademark Office*